United States Patent [19]

Ward et al.

[11] Patent Number: 5,896,522
[45] Date of Patent: Apr. 20, 1999

[54] SELECTIVE EMULATION INTERPRETATION USING TRANSFORMED INSTRUCTIONS

[75] Inventors: Wayne Douglas Ward; Merwin Herscher Alferness, both of New Brighton, Minn.

[73] Assignee: Unisys Corporation, Blue Bell, Pa.

[21] Appl. No.: 08/775,142

[22] Filed: Dec. 31, 1996

[51] Int. Cl.$^6$ .................................................. G06F 9/45
[52] U.S. Cl. .......................... 395/500; 395/385; 395/568; 395/707
[58] Field of Search ..................................... 395/500, 375, 395/568, 705, 708, 670, 385, 707

[56] References Cited

U.S. PATENT DOCUMENTS

| | | | |
|---|---|---|---|
| 5,291,586 | 3/1994 | Jen et al. | 395/500 |
| 5,321,821 | 6/1994 | Itomitsu et al. | 395/375 |
| 5,408,622 | 4/1995 | Fitch | 395/375 |
| 5,430,862 | 7/1995 | Smith et al. | 395/500 |
| 5,574,927 | 11/1996 | Scantlin | 395/800 |
| 5,632,028 | 5/1997 | Thusoo et al. | 395/500 |
| 5,652,889 | 7/1997 | Sites | 395/708 |
| 5,678,032 | 10/1997 | Woods et al. | 395/500 |
| 5,724,590 | 3/1998 | Goettelmann et al. | 395/707 |

Primary Examiner—Kevin J. Teska
Assistant Examiner—Thai Phan
Attorney, Agent, or Firm—Charles A. Johnson; Mark T. Starr; Merchant, Gould, Smith, Edell, Welter and Schmidt

[57] ABSTRACT

A system and method for providing high speed emulation of a computer system by transforming selected target instructions and bypassing target instruction decoding for those target instructions which have been transformed. A target computer system, controlled by a plurality of target instructions, is emulated on an emulation host computing system. Target instructions are successively loaded into the emulation host computing system in the order that the target instructions would be executed. The target instructions are decoded to identify the functions designated by the target instructions, and these functions are executed by the emulation host computing system. Emulation information is assigned to selected target instructions, where the emulation information controls execution of these selected target instructions, referred to as transformed instructions. Software routines identified by the emulation information are initiated for these transformed instructions, where the software routines execute the functions of the target instruction in the machine language of the emulation host computing system.

29 Claims, 14 Drawing Sheets

SELECTIVE EMULATION INTERPRETATION USING TRANSFORMED INSTRUCTIONS

FIELD OF THE INVENTION

This invention relates generally to computer emulation, and more particularly to a system and method for providing high speed emulation of a computer system by bypassing target instruction decoding and transforming selected target instructions to cause direct execution of native mode software routines corresponding to the target instruction functions.

BACKGROUND OF THE INVENTION

Computer emulation involves emulating a target computing system with a different computer system. There are various reasons for emulating a computer system, including testing, or debugging, the program code associated with the computer system. Another reason is that when a computer center is updated with different computing systems, the problem of program compatibility becomes acute.

Computer systems that have become obsolete may include program code which is not compatible with other computing systems which might be used to replace the obsolete system. When computers become obsolete, or are replaced for any reason, the users want to run their old programs on the new machine without having to rewrite them. These programs can be moved to the new machine provided that the new machine can simulate the execution of each individual instruction as well as the registers and hardware features of the old machine. This can be accomplished by providing the new programming level with an interpreter for executing programs in the old machine language. The interpreter for the old machine is typically referred to as an emulator.

There are various types of emulation available, including interpretive emulation and compiled emulation. The interpretive execution approaches uses an interpreter to decode each target computer instruction and call a routine to emulate each of the operations that would have been performed by the target system. This approach is effective, but slow. Emulating hardware functions is time consuming because hardware can perform many functions in parallel, while software must perform the same functions serially.

The compiled execution approach is faster than the interpretive approach. For compiled execution, a compiler analyzes object code instructions and converts them into native mode routines which perform the same function.

However, these emulation techniques still do not handle all situations, and still operate at less than desirable speeds. Emulation of object code by execution of pre-compiled instructions is not practical when there is a mixture of instructions and data within a memory bank, as the compiler is unable to differentiate between them. It is also not practical where instruction modification is allowed. Instruction modification (also referred to as self-modifying code) refers to the modification of the program as the program is executed. Although this technique is generally disfavored today, system still exist with such self-modifying code, and the compiled execution approach does not handle such a situation well.

It is therefore desirable to provide very fast emulation of the target computing system, and to manage situations such as instruction/data mixtures and self-modifying code. The present invention provides a new approach called "transformed execution", that utilizes transformed instruction and data banks which in turn allows certain emulation steps to be bypassed, thereby increasing emulation efficiency and performance. The present invention provides numerous advantages over the prior art, including selectable execution performance based on transformation time and storage space tradeoffs, wherein high performance transformations can be directed at high usage banks or instructions, and slower (more space saving) transformations can be directed to lower usage banks or instructions. Instruction modification is allowed, and the original instructions are never destroyed or modified by the transformation. The transformed banks are portable, and allow for a mixture of instructions and data. Improvements in transformation techniques can be included without user intervention, by implementing additional emulation code and selecting a new level of transformation.

The present invention provides a solution to the aforementioned problems, and offers other advantages over the prior art.

SUMMARY OF THE INVENTION

The present invention relates to a system and method for providing high speed emulation of a computer system by bypassing target instruction decoding and transforming selected target instructions to cause direct execution of native mode software routines corresponding to the target instruction functions.

In accordance with one aspect of the invention, a method for emulating a computer system on an emulation host computing system is provided. The computer system is controlled by a plurality of target instructions. The method includes successively loading each of the target instructions into the emulation host computing system in the order that the target instructions would be executed. Each of the target instructions is decoded to identify the function designated by the target instructions. These identified functions are then executed by the emulation host computing system. Emulation information can be assigned to selected target instructions, where the emulation information controls execution of these selected target instructions. Target instructions which have been assigned emulation information are referred to as transformed instructions, as they include additional information from the original target instruction. Software routines identified by the emulation information are initiated for these transformed instructions. These software routines execute the functions of the target instruction, but do so in a machine language of the emulation host computing system. Therefore, for those instructions which have been transformed, interpreting and decoding of the target instructions is no longer necessary, and native mode software routines within the emulation host computing system are directly executed at the direction of the emulation information.

In accordance with another aspect of the invention, a method for emulating a computer system on an emulation host computing system is provided. The computer system is controlled by a plurality of target instructions stored in one or more instruction banks. The method includes successively receiving the target instructions from the instruction bank in the order they would be executed by the computer system. The target instructions are interpreted to identify the functions that are designated by the target instructions. These identified functions are executed using hardware and native mode machine language of the emulation host computing system. Selected target instructions may be transformed into "transformed instructions", which include the target instruction and an emulation code which controls the manner in which subsequent executions of the transformed instructions occur. The emulation codes are analyzed for each instruction to determine whether the instruction has previously been transformed into a transformed instruction. Where an instruction has been previously transformed, the function of its associated target instruction is executed in response to the emulation code using the hardware and the native mode machine language of the emulation host computing system. The emulation code designates a software routine written in the native mode machine language to perform the function of its associated target instruction. Therefore, the steps of interpreting and transforming are bypassed for subsequent occurrences of the transformed instructions. Data may also be transformed in an analogous manner.

In accordance with another aspect of the invention, an emulator for emulating a target computer system is provided. The emulator is used to emulate a target computer system which has a plurality of target instructions which control the target computer system. The emulator includes memory for storing the target instructions and emulation software routines in various memory banks. The emulator includes inputs to receive the target instructions in the order they are normally executed on the target computer system. A controller is provided to determine whether each of the target instructions has previously been transformed. An instruction transformer converts selected target instructions into transformed instructions, where each of the transformed instructions include a corresponding target instruction and an emulation code. The emulation code identifies emulation software routines which perform functions designated by the corresponding target instruction. An interpreter decodes target instructions which have not been transformed, in order to identify the functions designated by the target instructions. A processor executes the functions designated by the non-transformed target instructions, and also executes the emulation software routines that are associated with the transformed instructions. The emulator can emulate the target computer system at a much faster rate where the target instructions have been transformed, as the interpreter can be bypassed for transformed instructions, as no decoding of the target instructions is required.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawing and description are to be regarded as illustrative in nature, and not as restrictive.

DETAILED DESCRIPTION OF THE ILLUSTRATED EMBODIMENTS

Figure 1:
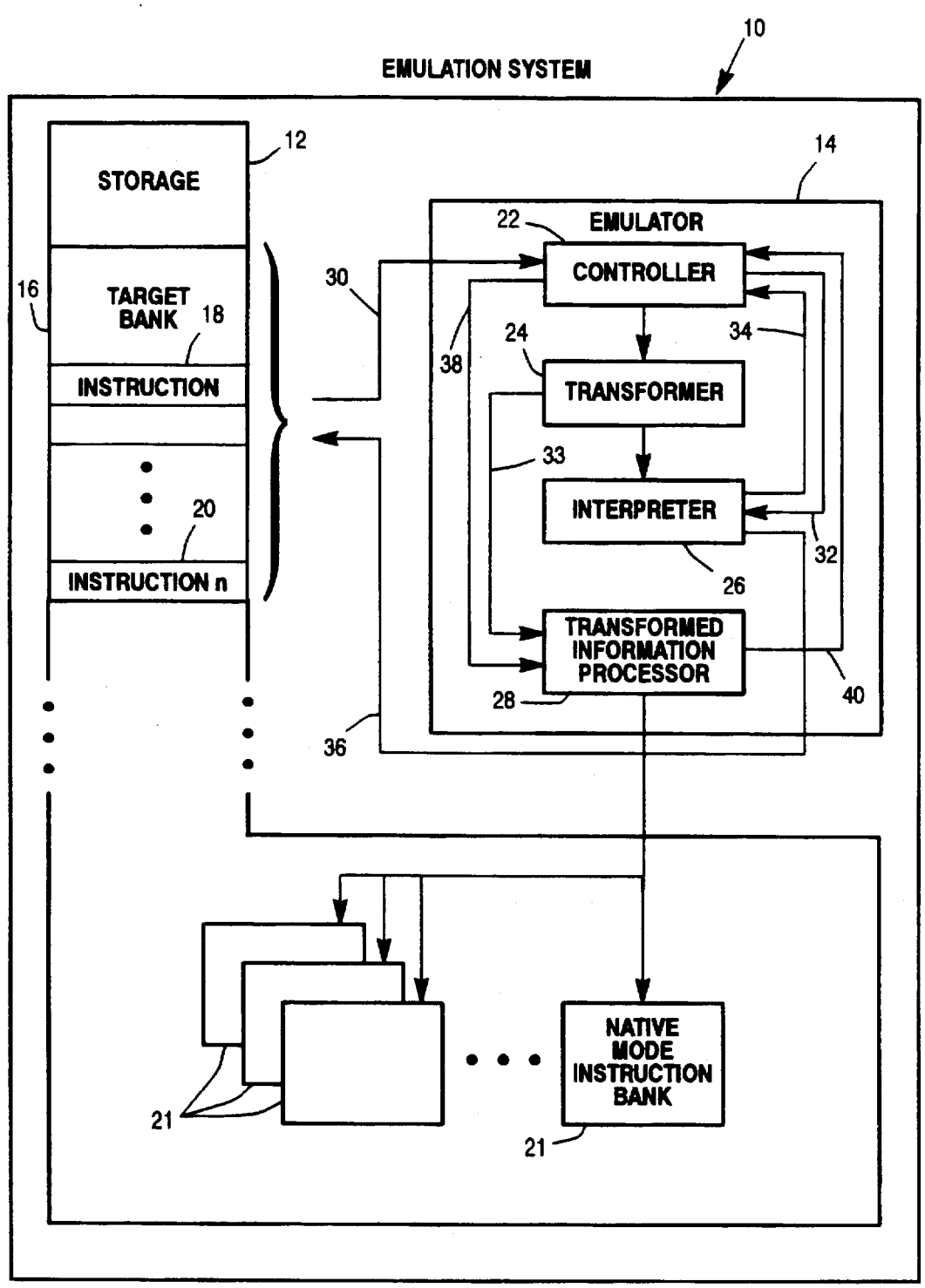
FIG. 1 is a block diagram of an emulation system in accordance with the present invention.

FIG. 1 is a block diagram of an emulation system 10 in accordance with the present invention. The emulation system 10 allows instructions targeted for emulation (i.e., instructions which are normally associated with a particular computing system hereinafter referred to as the "target system") to be stored in the emulation system's storage 12, and to be emulated by the emulator 14. Because the target system is being emulated by the emulation system 10, the physical target system hardware need not be present, and only the digital information normally used with the target system is needed in order for the emulation system 10 to emulate the target system.

The storage 12 represents a computer memory for storing the instructions normally executed by a target system (not shown), and may also store the software components of the emulator 14. The storage 12 may be divided into various memory "banks", including instruction banks and data banks, which are separated for various reasons. One reason to separate the storage 12 into memory banks is that banks can be compiled and collected separately. The banks can also be common banks so that the information contained therein may be shared by other processing units or other programs. The memory banks may be accessed directly, or through the use of computer registers which point to different starting addresses of each memory bank.

One representative memory bank in FIG. 1 is labeled the target bank 16, which for the present example is a bank of instructions normally executed by the target system. Therefore, the target bank 16 includes multiple instructions 18, having "n" total instructions represented by instruction n 20. The present invention allows the target bank 16 instructions 18 to be transformed to allow the emulation system 10 to more quickly execute the function designated by the original target system instruction. The instructions that have been transformed optionally allow the target system instruction function to be executed by instructions native to the emulator 14. The target bank 16 may therefore be transformed into a bank of transformed instructions which point to corresponding native mode instructions within one or more associated native mode instruction banks 21 within storage 12. These native mode instruction banks 21 therefore store the native mode routines that correspond to the target system instructions to be emulated.

The target bank 16 is transformed into a bank of transformed instructions by associating an emulation code with each of the instructions to be transformed. An instruction is transformed by updating the emulation code associated with the original target bank instructions. In a preferred embodiment of the invention, each target instruction includes additional bits which are set aside to store the emulation code, as will be described in further detail in the description corresponding to FIG. 2. The corresponding native mode instructions in the instruction banks 21 can be executed much faster than the time it takes to interpret and execute each of the original instructions from the target bank 16.

In one embodiment of the invention, the emulator 14 can be described in terms of four major components, labeled the controller 22, the instruction transformer 24, the interpreter 26 and the transformed information processor block 28.

Although the emulator 14 could be exclusively constructed from hardware, the emulator 14 of the preferred embodiment includes software which is executed by a central processing unit of the emulator 14.

The controller 22 segment of the emulator 14 examines the instructions 18 from the target bank 16, as represented by line 30. The controller 22 determines whether instruction 18 through instruction n 20 have yet been transformed by the emulator 14. The first time instructions 18 (which have been selected to be transformed) are examined by the controller 22, the selected instructions 18 have not yet been transformed, and may be transformed by the transformer 24. Those instructions which are not selected to be transformed will be interpreted by the interpreter 26, as line 32 illustrates.

As will be described in more detail below, the transformer 24 converts the instruction 18 into a form which includes information regarding how the instruction 18 is to be emulated within the emulation system 10. This more easily recognized form corresponds to the computing language associated with the processing unit of the emulator 14, referred to as the "native mode" machine language. Once transformed, the transformed instructions can be more quickly and efficiently recognized and executed by the emulator 14 operating under the control of the native mode machine language.

In the example of FIG. 1, a transformation by transformer 24 may occur after the controller 22 determines that an instruction to be transformed has not yet been transformed. An instruction transformed at the transformer 24 can completely bypass the interpreter 26, as line 33 indicates, and can then be executed directly by the instruction processor 28 using native mode instructions. The interpreter 26 interprets instructions which have not yet been transformed by decoding the target instructions, and performing the functions that the instruction would normally do when executed on the target computing hardware. An interpreter typically decodes each target system instruction and invokes a routine to emulate each of the operations that would normally be performed by the target system hardware. Rather than the instructions being executed by the target computing system, the emulator 14 "simulates" or emulates the target computing system via the interpreter 26.

The interpreter 26 includes emulation software operating under the control of the native mode processing unit of the emulator 14 and is written to perform the functions required by the instruction. This typically involves repetitive functions for each instruction such as decoding the instruction and the instruction operand, generating addresses, and so forth. Once an instruction is interpreted, the interpreter 26 passes control to the controller 22, as shown by line 34, and the controller 22 increments its address pointer. An emulation code associated with the target instruction is updated in the target bank 16, as indicated by the update instruction path 36. Alternatively, the transformed instruction could be stored in a separate "transformed instruction" portion of the storage 12, however in the preferred embodiment the emulation codes are stored in spare bit locations of their respective target instructions.

The present invention allows the interpreter 26 to be bypassed once the instruction has been transformed, thereby bypassing repetitive instruction functions, since transformed instructions will be directed to native mode machine language in the native mode instruction banks 21. This is evidenced by line 38 which allows the transformed instructions to be directly processed by the transformed information processor 28. The transformed information processor 28 in the preferred embodiment is the same processing unit which controls the emulation system 10. The transformer 24 and interpreter 26 are bypassed where the controller 22 determines that the instruction has already been transformed, and no interpretation or further transformation is required. However, even where an instruction has been transformed, it may again be transformed for various reasons, including retransforming to a different transformation level, or because a transformed instruction has been reset to an "original" instruction. Changing transformation levels and resetting target instructions to "original" instructions is discussed in further detail below. When the instruction has been processed at processor 28 by the native mode machine language, the address pointer in the controller 22 is incremented, as represented by line 40, to accept the next instruction from the target bank 16.

Figure 2:
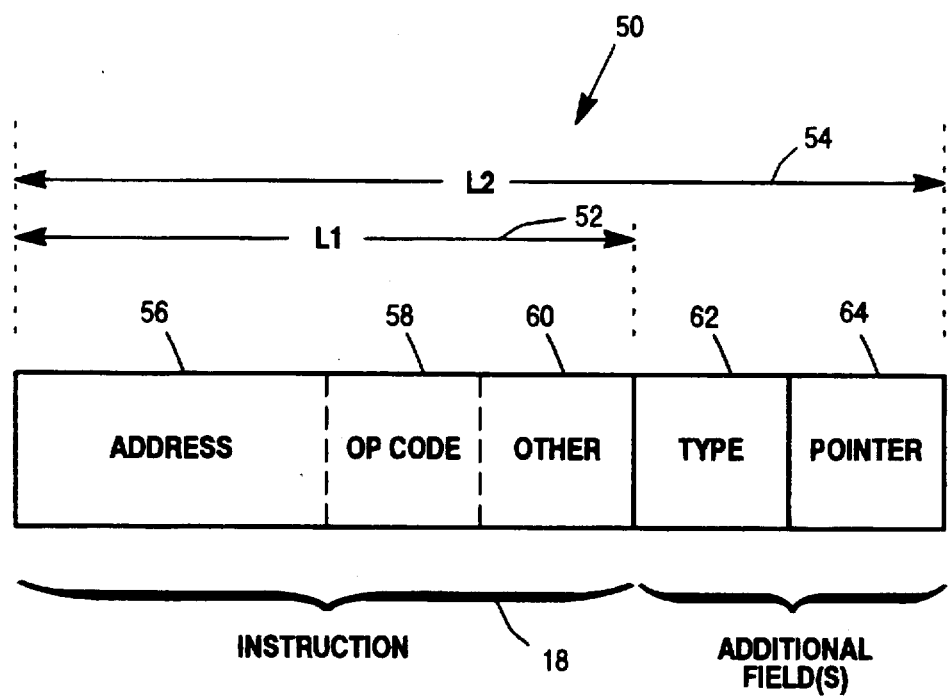
FIG. 2 is a diagram of an instruction which has been transformed into a transformed instruction.

FIG. 2 is a diagram of an instruction 18 which has been transformed into a transformed instruction 50. Instruction 18 through instruction n 20 of FIG. 1 have an instruction length L1, represented by line 52. However, in one embodiment of the invention the overall length L2 represented by line 54 is larger than the length L1 of the instruction 18. The instruction 18 may include various fields, including an address field 56, and an instruction operation code 58, as well as other fields represented by generic field 60.

Instruction 18 is transformed by the emulator 14 into a transformed instruction 50 by providing one or more additional fields in the transformed instruction 50. These additional fields account for the increased length L2 54 over the length L1 52 of instruction 18. In one embodiment of the invention, these additional fields in the transformed instruction 50 include the type field 62 and the pointer field 64. These fields hold transformed instruction information which allows the emulator 14 to view the transformed instruction 50 as an instruction corresponding to a section of native mode machine language of the emulator 14. It should be recognized that the additional fields 62 and 64 need not necessarily be appended to the instruction 18, but could be stored at separate memory locations not appended to instruction 18 without departing from the scope and spirit of the invention. In the preferred embodiment, the additional fields 62 and 64 are part of the instruction, because instruction stream modification is more easily managed.

The transformed instruction 50 embodiment of FIG. 2 is a preferred embodiment, however, because the additional transformed fields 62 and 64 are already associated with its corresponding instruction 18 as spare bits in a fixed length instruction, thereby eliminating the need to provide a flag or an address to locate the type and pointer fields in a separate memory. Furthermore, emulators 14 often include hardware having larger architectural word sizes than the hardware system which it is emulating. This is often due to the fact that the emulator 14 is used to emulate an older, or more obsolete hardware system. Therefore, a particular number of spare bits may be available to include the additional fields 62 and 64 with the instruction 18. For example, the target hardware system may include a 32-bit address bus and a 32-bit data bus, where the emulator 14 operates on a 64-bit address and data bus. This would result in 32 spare bits in which the additional fields can be appended to the instruction 18.

In another embodiments the invention, the instruction 18 has a fixed length different from multiples of the traditional 8 bit byte. For example, in one embodiment the instruction 18 is 36 bits long, which requires greater than a 32 bit bus. For a 64-bit bus, this results in an additional 28 bits in which the type field 62 and the pointer field 64 may be appended to the instruction 18. These additional fields 62 and 64, or other fields, will be described in greater detail below.

Figure 3:
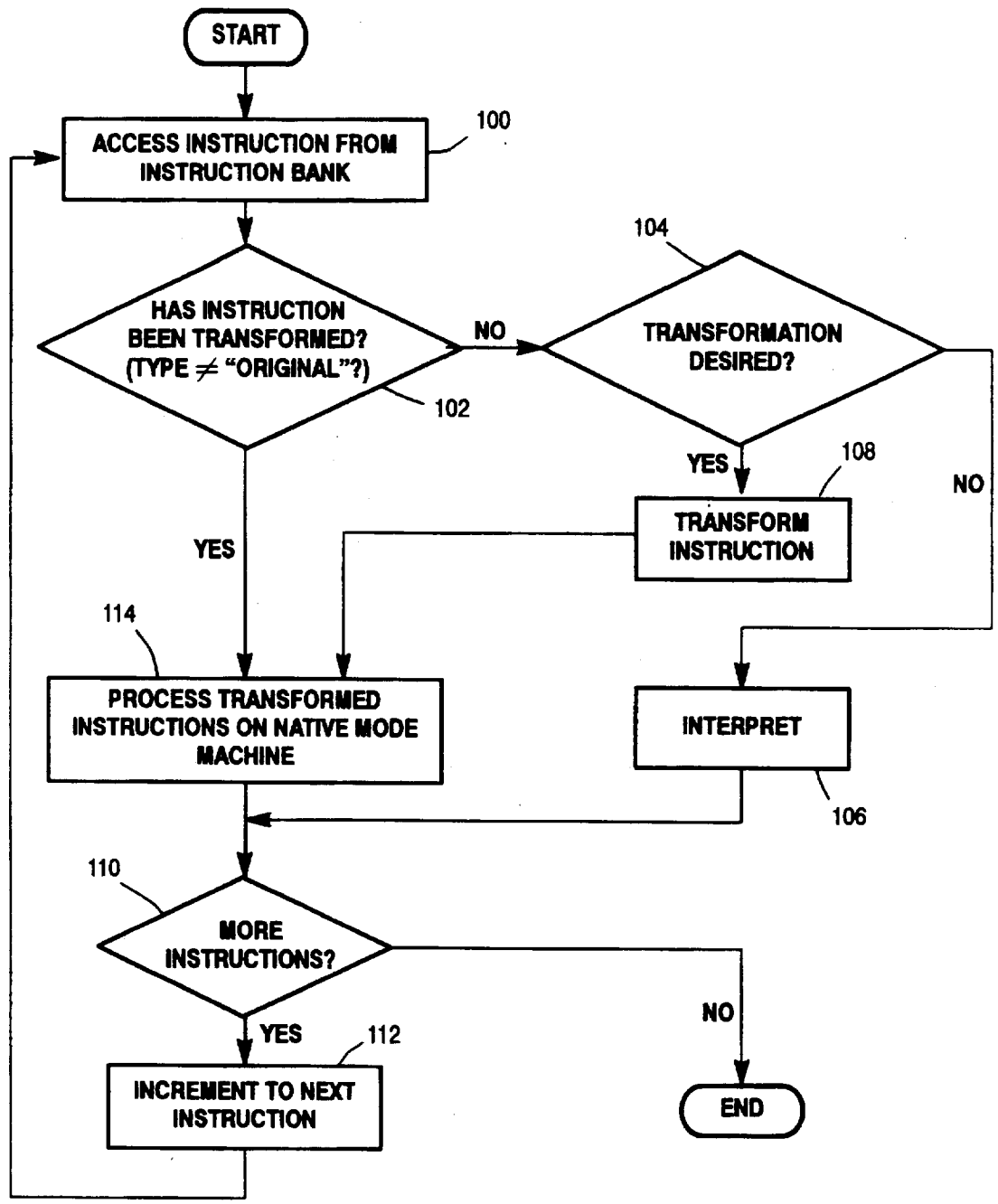
FIG. 3 is a general flow diagram illustrating one aspect of the invention.
Figure 4A:
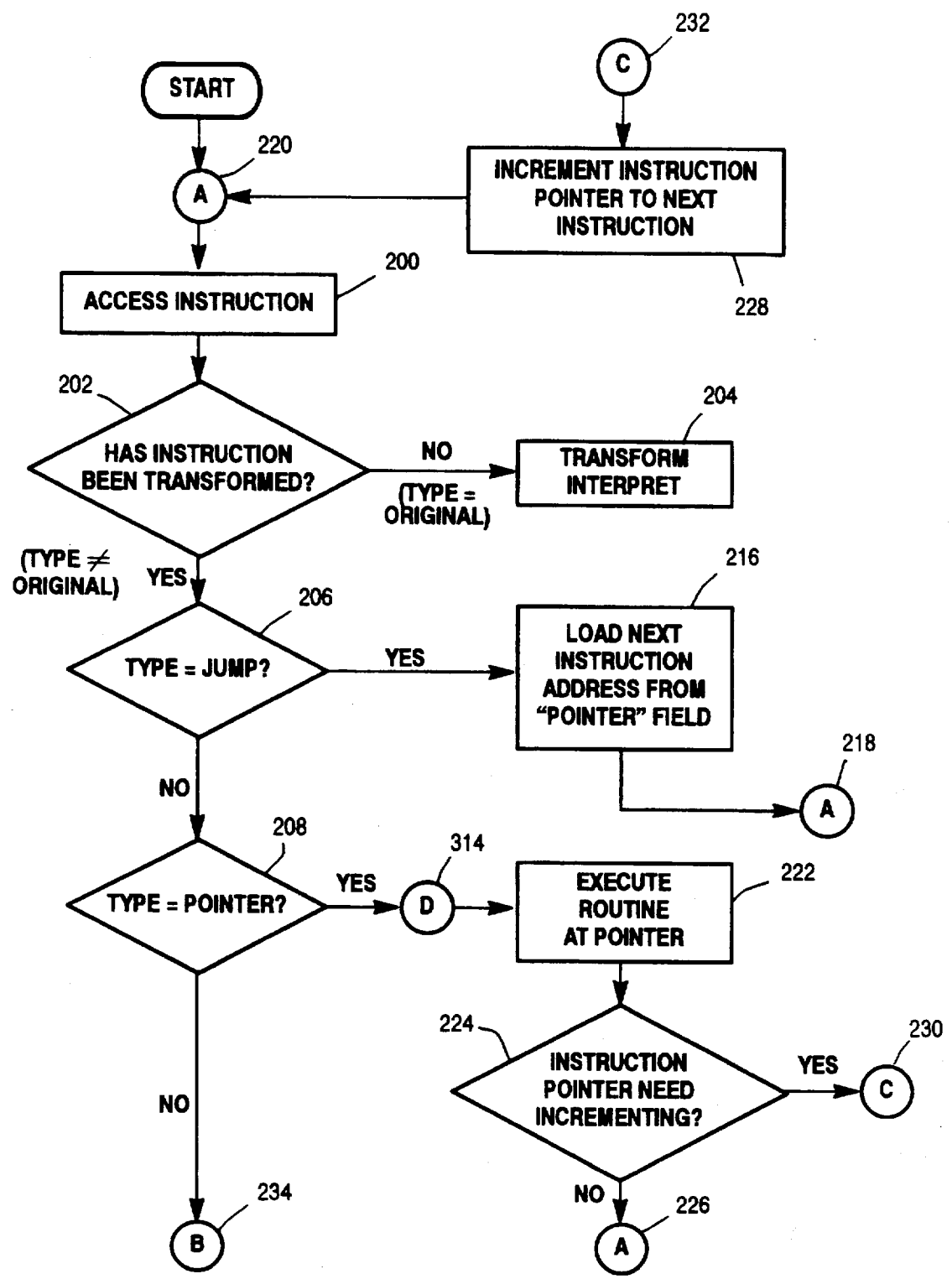
FIGS. 4A-4H illustrate more specific flow diagrams of various embodiments of the invention.
Figure 4B:
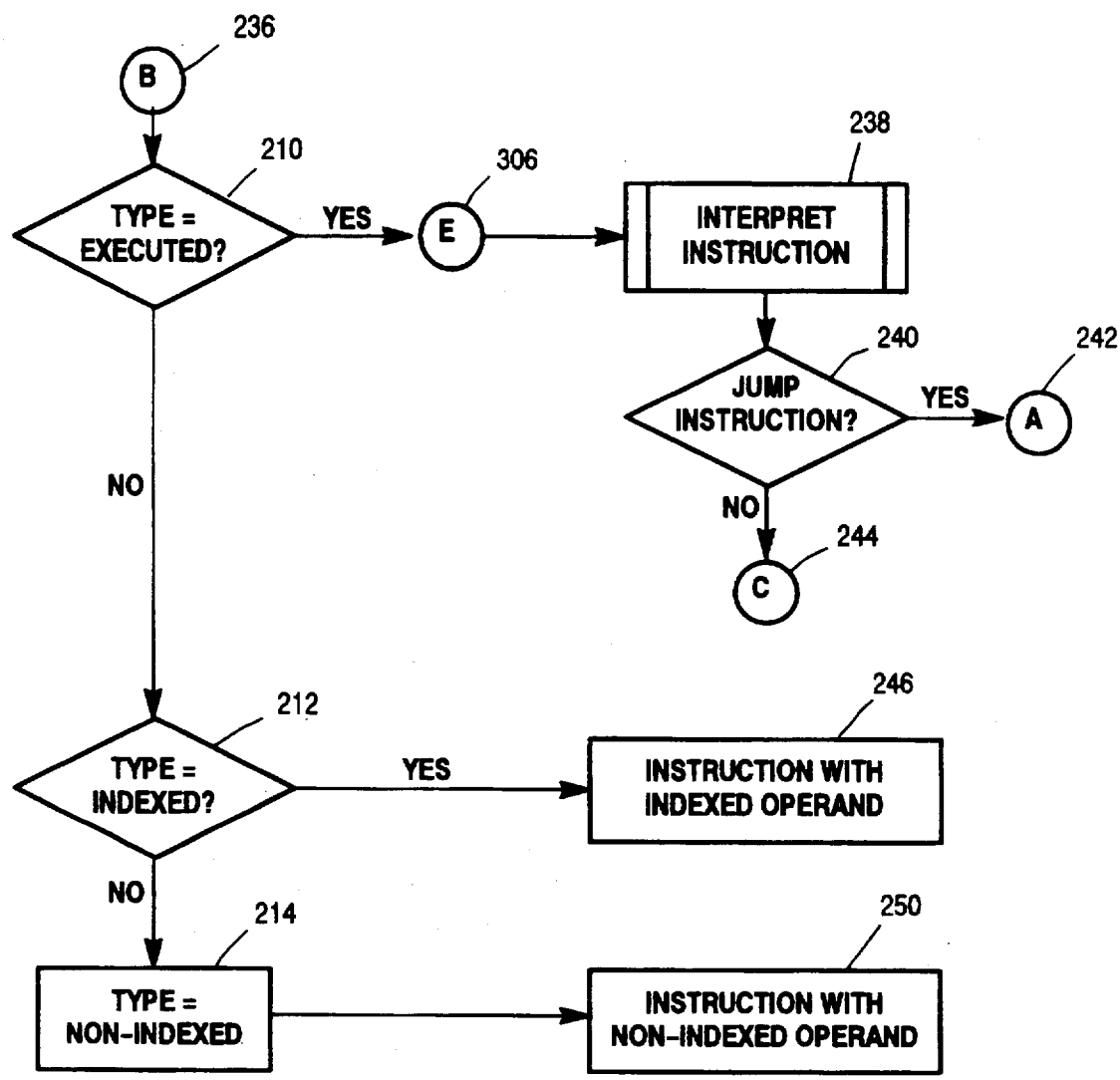
Figure 4C:
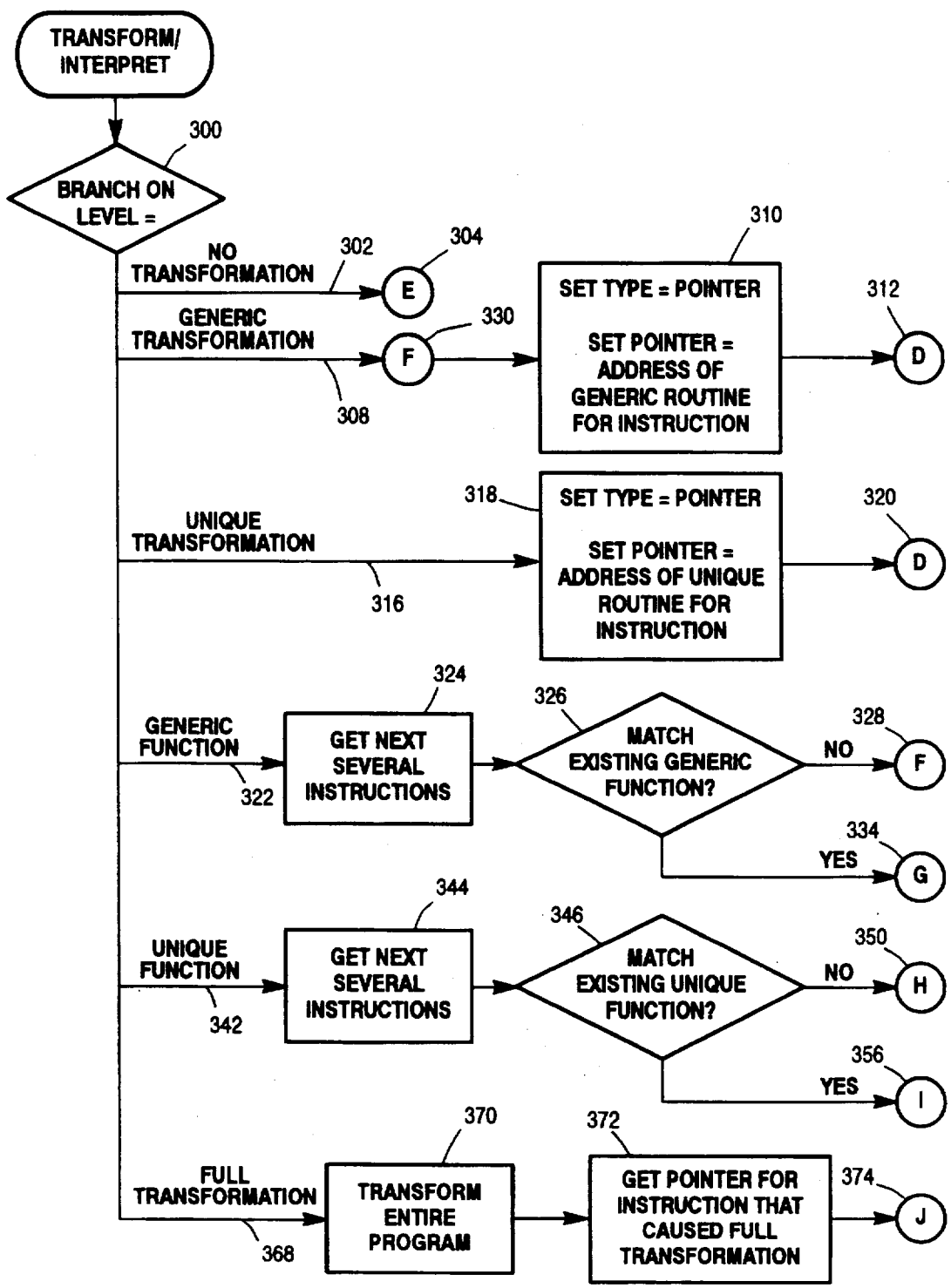
Figure 4D:
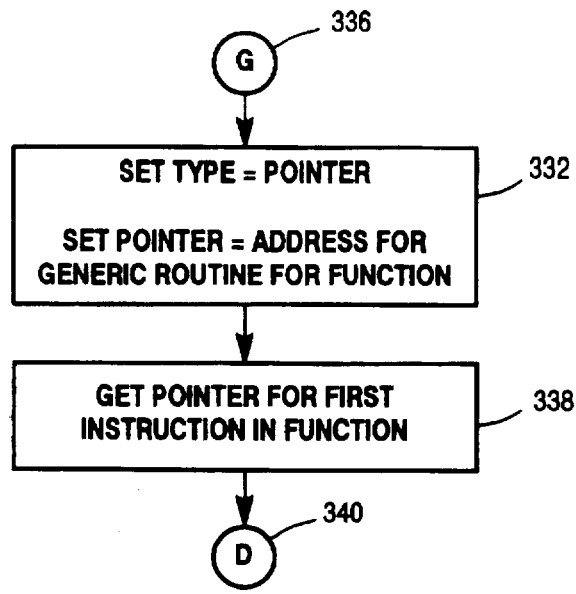
Figure 4E:
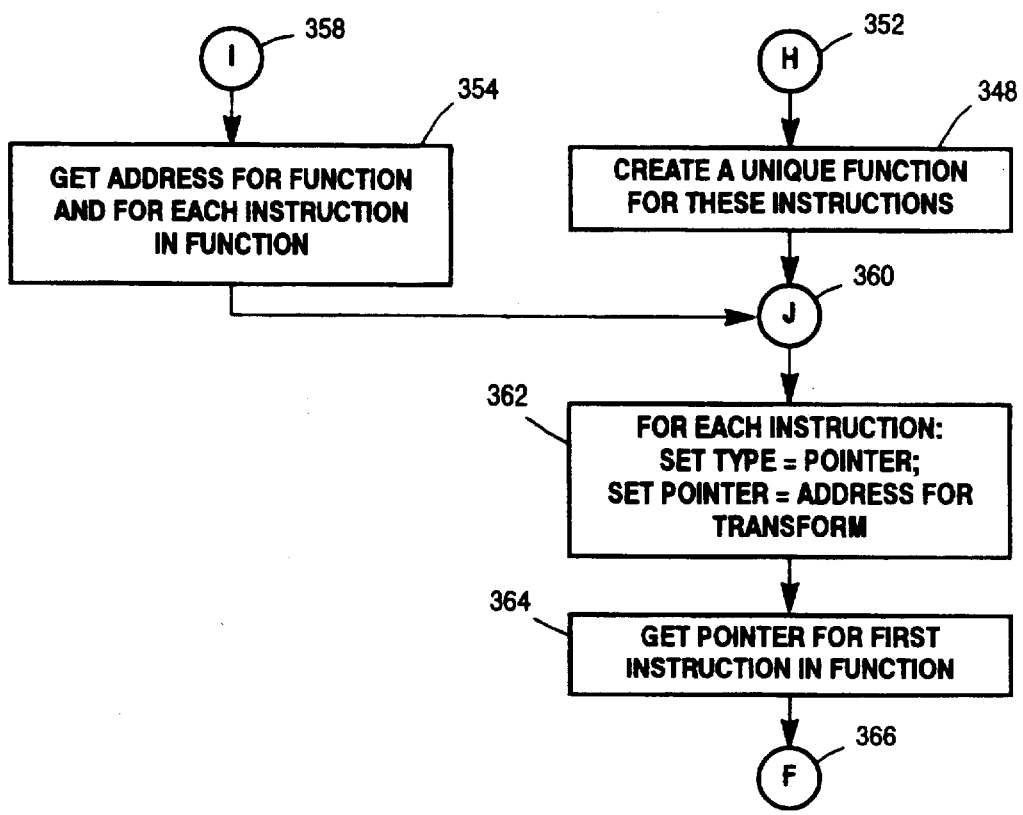
Figure 4F:
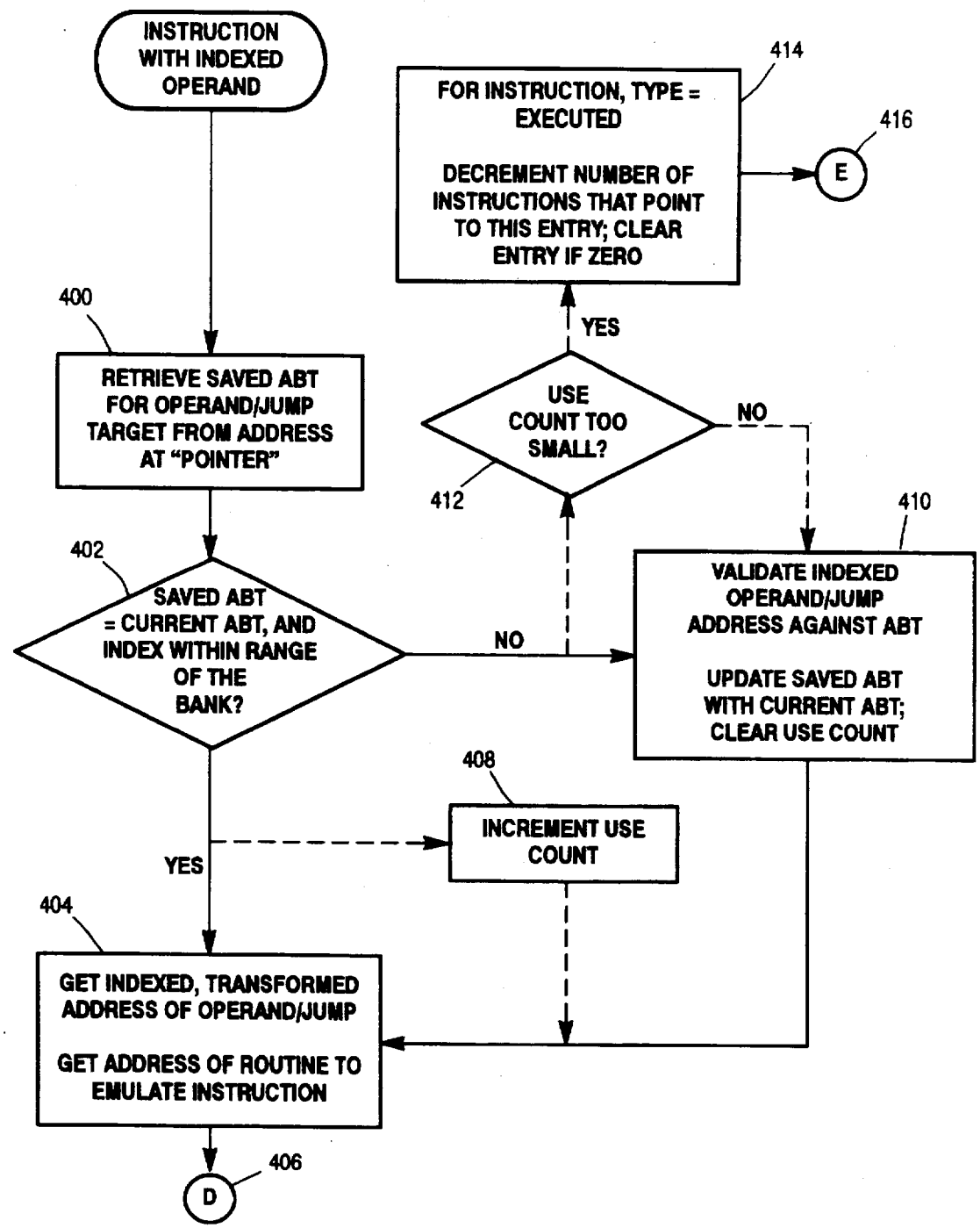
Figure 4G:
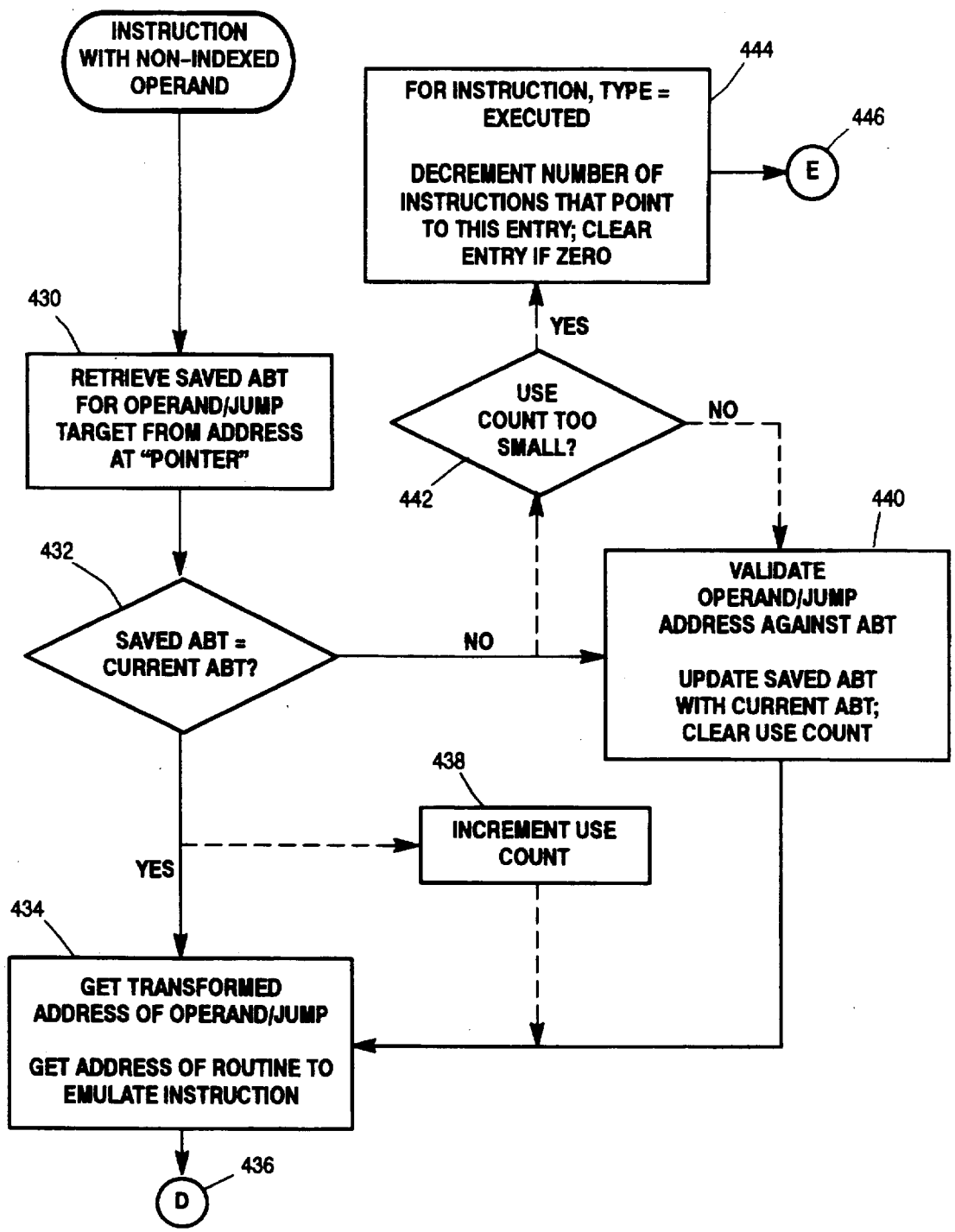
Figure 4H:
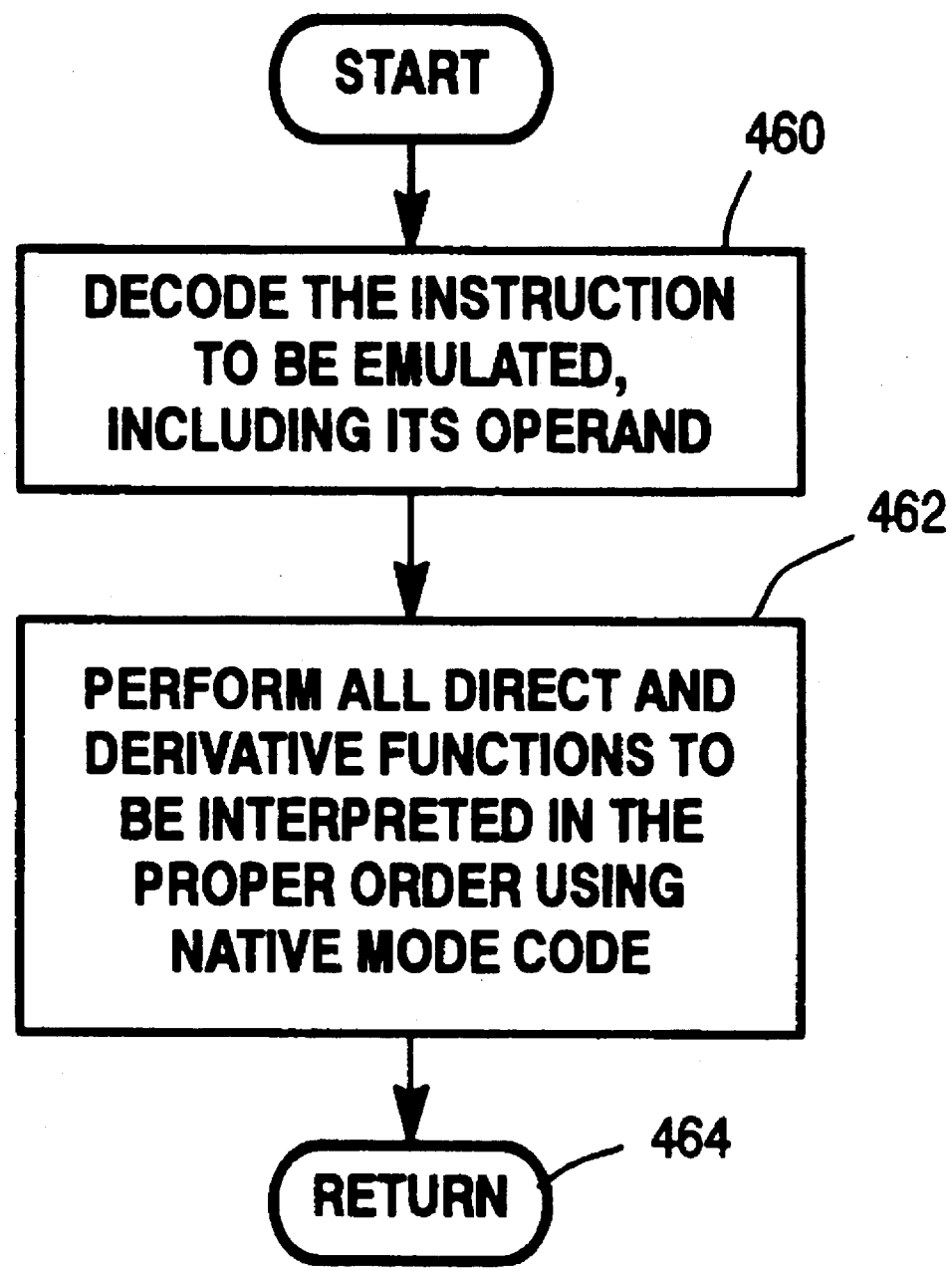

The following description regarding FIGS. 3–4H are directed to instruction transformation. However, data transformation is accomplished in a similar manner, as will be readily apparent to one skilled in the art after reading the following description regarding FIGS. 3–4H. Data transformation is described in detail in connection with FIG. 11.

FIG. 3 is a general flow diagram illustrating one aspect of the invention. Processing begins at step 100 where an instruction is accessed by the emulator from the instruction bank. The instruction bank can be within the storage 12 of the target system, or alternatively could be transferred from the storage 12 of the target system to an independent memory separate from the storage 12 of the target system. At decision step 102, a determination is made to see whether the accessed instruction has previously been transformed or not. An instruction which has not yet been transformed is referred to as an "original" instruction. Once an instruction has been transformed it is no longer an original instruction. However, a transformed instruction will recapture its "original" status where the instruction 18 portion of the transformed instruction is modified. For example, this can occur where information is stored into the instruction 18 itself, such as where self-modifying code is used.

Where a transformed instruction format such as the transformed instruction 50 of FIG. 2 is used, a determination can be made as to whether the instruction is an original instruction or not by monitoring the spare bits represented by the type field 62. For original instructions, field 62 is set to a predetermined value which indicates that the instruction has not yet been transformed. For example, field 62 is cleared in one embodiment of the invention such that it includes only zero bits, i.e., field 62 is "zero filled". When this occurs, the type field 62 is considered to be type "original", indicating that the instruction has not yet been transformed. It should be recognized that other digital methods of indicating a type equal original can be used, such as the use of a flag bit directly indicating whether the instruction has been transformed or not.

Where the instruction has not been transformed, processing continues at decision step 104 where a decision is made as to whether or not to transform that particular instruction. For example, instructions identified on a program basis or particular instructions having a certain function code or operand may be designated such that transformation is not desired. This may be desired for instructions that are carried out very infrequently where the time taken to transform the instruction is unproductive in view of the very few times it will be executed. Where a transformation is not desired, processing is forwarded directly to the interpret step 106 where the instruction is interpreted, as will described in greater detail below. Once the instruction has been interpreted at step 106, if there are more instructions to be interpreted as determined at decision step 110, an address pointer increments to the next instruction as illustrated at step 112, which returns processing to decision step 100 after the address pointer has been incremented. If there are no more instructions to be emulated as determined at decision step 110, processing of that program or that particular group of instructions ends.

Where a transformation is desired at decision step 104, processing continues to the transform instruction step 108 where the instruction is transformed into a format which is more readily recognized by the native mode machine language of the emulator 14 the next time that particular instruction is presented to the emulator 14. This transformation includes storing a particular instruction type in the type field 62 of FIG. 2, and possibly an address pointer value in the pointer field 64 of FIG. 2. The type and pointer fields 62 and 64 include native mode machine language which is readily recognized by the emulator 14. After an instruction has been transformed at step 108, processing moves from step 108 to step 114, where the transformed instruction designates one or more native mode routines to be executed on the native mode machine directly.

Where an instruction is recognized at decision step 102 to have already been transformed, the type in type field 62 is no longer type "original", and processing moves from decision step 102 directly to step 114 where the transformed instruction designates one or more native mode routines to be executed on the native mode machine directly. As can be seen by the flow diagram of FIG. 3, the interpretation at step 106 can be bypassed, since an instruction has already been transformed into a transformed instruction which points to native mode machine language. Therefore, by transforming the instruction the first time the instruction is emulated, a great deal of time is saved on each subsequent execution of that instruction.

In another embodiment of the invention, a method of transformation could be provided which combines the transform step 108 and the interpretation step 106. In such a case, the interpretation and transformation would be accomplished substantially simultaneously, and would then processing would continue to decision step 110. In this case, an interpretation occurs every time the first time a target instruction is transformed. This differs from FIG. 3, wherein an instruction transformed at step 108 is not necessarily interpreted, as processing continues to step 114 after the transformation occurs. By combining steps 106 and 108, during the interpretation process at step 106 information could be gathered which could be used as part of the transformation. For example, an address decoded by the interpretation step 106 could be used as part of the emulation information to be placed in field 64 for a unique transformation.

FIGS. 4A–4H illustrate a more specific flow diagram of another embodiment of the invention. Referring first to FIG. 4A, processing starts at step 200, where the instruction is accessed from the instruction bank. When an instruction has been accessed, processing continues at decision step 202, where it is determined whether the instruction has previously been transformed. If the instruction has not been transformed (TYPE equals "ORIGINAL"), processing continues at routine 204, where an instruction transformation and an instruction interpretation occurs.

If the instruction has already been transformed (TYPE not equal to "ORIGINAL"), an analysis is performed to determine the type of transformation that occurred, and whether the transformation resulted in a native mode address being stored in the POINTER field (see TYPE field 62 and POINTER field 64 of FIG. 2). Among the decision steps in this analysis are decision steps 206, 208, 210, and 212. Where the transformation type is not among the types in these decision steps, the TYPE is "NON-INDEXED", which is the final option at step 214. It should be recognized that the order in which the TYPE field is analyzed is irrelevant with respect to the invention.

The TYPE field, shown in FIG. 2 as the TYPE field 62, contains a value which indicates the type of transformation that has been done on the instruction 18. As previously indicated, in one embodiment a value of zero indicates that no transformation has been done on this instruction (TYPE= ORIGINAL). The first time each target system instruction is executed, it may be transformed from TYPE "ORIGINAL" into another type. Some other transformation types, which are determined by steps 206 through 214, include types JUMP, POINTER, EXECUTED, INDEXED, and NON-INDEXED. Other transformation types could be added or deleted without departing from the scope and spirit of the invention.

A second field was shown in FIG. 2 as the POINTER field 64. This field contains an address pointer dependent on the transformation type in the TYPE field 62. Where the transformation type equals "POINTER", the POINTER field 64 contains a pointer to a native mode emulation routine for the associated instruction or instruction group. For transformation TYPE equal to type "JUMP", the POINTER field 64 contains a native mode address pointer to the next target system instruction to be executed. Other types may use the POINTER field 64 to point to a packet of relevant data.

The controller 22 examines the TYPE field to determine whether the instruction has previously been transformed. If the instruction indicates that the type is TYPE "ORIGINAL", the instruction can be transformed to a native mode form based on the characteristics of the instruction, and a transformation level selected for the instructions in that particular "bank".

Decision step 206 determines whether the transformation TYPE field 62 includes type "JUMP". An instruction was first transformed at the transform/interpret step 204 the first time the instruction was read from the instruction bank. When the transformation has made the TYPE equal to JUMP as determined at decision step 206, processing continues at step 216. A type JUMP instruction is transformed from a non-indexed, unconditional jump in the target system. In this transformation, the jump target address was validated by the transform/interpret step 204. Step 216 includes loading, from the POINTER field 64, a native mode address pointer of the next target system instruction to be executed. When the next instruction address has been loaded, processing returns to step 200 via link "A" 218 to link "A" 220, and the instruction at native address "POINTER" is jumped to at step 200, and processing continues normally for that new instruction.

Where the TYPE is not "JUMP" at decision step 206, processing continues to decision step 208, where it is determined whether the transformation TYPE field 62 includes type "POINTER". A type POINTER instruction has associated information in the POINTER field 64 that points to a native mode emulation routine for the corresponding target system instruction or group of instructions. Where the TYPE is POINTER, processing continues at step 222, where the native mode routine designated by the address in the POINTER field 64 is executed. Upon completion of execution of this routine, it is determined whether the instruction pointer needs to be incremented at decision step 224. Because there are many different routines which may be executed due to the address pointer pointing to these various routines, they may or may not be invoked with a subroutine call, and therefore may or may not return via a subroutine return. Therefore, where there is no subroutine called, the address pointer may already be pointing to the next instruction, in which case processing returns to step 200 via link "A" 226 to link "A" 220. In some case, such as where a subroutine call returns via a subroutine return, the instruction pointer must be incremented to the next instruction, and therefore processing is forwarded to step 228 via link "C" 230 to link "C" 232.

Where the TYPE is not "POINTER" at decision step 208, processing continues to decision step 210 via link "B" 234 to link "B" 236. Decision step 210 determines whether the transformation TYPE field 62 includes type "EXECUTED". A type EXECUTED instruction is used where the particular instruction is not to be transformed for one reason or another. For example, this can occur where a particular instruction is very rarely executed. This could also occur where self-modifying code is used, and the instruction is modified so often that it would not be worth trying to transform the instruction because the instruction would repeatedly return to the "original" state. There may also be other reasons for which a programmer would decide an instruction should be restricted from being transformed.

As previously described, an instruction is returned to the "original" state when it has been changed, which causes the TYPE and POINTER fields 62 and 64 to return to a predetermined value. The predetermined value used in a preferred embodiment is a zero value, where the TYPE and POINTER fields are zero-filled. These fields are automatically zero-filled where an instruction has been modified.

Therefore, where the TYPE is "EXECUTED", no transformation will be performed, which means that an interpretation is still required. Processing then continues at subroutine 238, which proceeds to an interpret routine to interpret the non-transformed instruction. Following the interpretation at step 238, processing continues at decision step 240, where "jump" instructions interpreted at step 238 proceed to step 200 via link "A" 242 to link "A" 220. Where the interpreted instructions are not "jump" instructions, processing proceeds to step 228 via link "C" 244 to link "C" 232.

Where the TYPE is not "EXECUTED" at decision step 210, processing continues to decision step 212. Decision step 212 determines whether the transformation TYPE field 62 includes TYPE "INDEXED".

Indexed addressing is an addressing method in which the effective address is the sum of the current contents of an index register and an offset usually provided by the instruction, such as the address field 56 in FIG. 2. In one embodiment of the invention, there are at least two types of registers: A-registers and X-registers. A-registers cannot be used for indexing, but instead are the accumulators and other general purpose registers. X-registers, on the other hand, are the "index registers" in the target computing system's architecture, and the instruction will typically include a modifier, which is the offset to be added to the address 56 as shown in FIG. 2.

There may, however, be multiple areas of storage, referred to as "banks", which represent various programs or groups of data. Examples of such banks were shown in FIG. 1 as native mode instruction banks 21. Therefore, there are multiple index registers, or X-registers, and bank descriptors (BD) which include the starting address of its corresponding bank. The BD also describes various characteristics regarding the memory bank, such as access rights and the type of access (e.g., read, write, execute) allowed. An active base table (ADT) stores each of the bank descriptors (BD) which holds the currently-executing program accesses.

Where instructions include an indexed operand, and indexed processing is desired, processing continues to routine 246, which is further described in connection with FIG. 4F.

Where the TYPE is not "INDEXED" at decision step 212, processing continues to step 214. Step 214 indicates that the type is TYPE "NON-INDEXED". A NON-INDEXED type indicates that the address does not utilize indexed addressing, in which case routine 250 is called. Routine 250 will be described in further detail in connection with FIG. 4G.

It should be recognized that the decision steps 206, 208, 210, 212 and 214 do not reflect the actual coding strategy used in the preferred embodiment, but instead merely illustrates that the TYPE could be any of the types shown in these decision steps. For example, the flow diagram illustrates that the TYPE could be JUMP, POINTER, EXECUTED, INDEXED, or NON-INDEXED, but the decision steps do not necessarily indicate that the emulation hardware and/or software sequentially performs "compare" functions to determine what the TYPE is. In the preferred embodiment, no "compare" is performed, but rather an address table is used where the particular TYPE value is an address offset from the start of the address table, thereby automatically jumping to the corresponding emulation routine.

Referring now to FIG. 4C, a flow diagram of the transform/interpret routine 204 is provided. The first step in the process is to determine what level of transformation has been designated. This is accomplished at decision step 300, where the designated transformation level is determined. The level of transformation can be selected on a program, memory bank, or system basis. There are restrictions and tradeoffs in selecting the transformation level. For example, full transformation takes longer than other transformation levels to run initially, as all instructions are transformed. Furthermore, full transformation may require more storage space, as more native mode program routines are utilized. However, once transformed, the speed of a fully transformed system is very fast compared to non-transformed systems.

In one embodiment of the invention, there are six transformation levels, including "no transformation", "generic transformation", "unique transformation", "generic function transformation", "unique function transformation" and "full transformation". A memory location or register can be used to store the desired transformation level, and depending on which level is designated, a corresponding path in the flow diagram of FIG. 4C is followed.

Where decision step 300 recognizes a designated transformation level of NO TRANSFORMATION as shown on line 302, all instructions are interpreted each time they enter the emulating system. Therefore, no transformation will be performed on the instructions. This may be acceptable where a particular instruction bank is used very little (e.g., instruction bank for various error routines), or instruction banks having a high rate of self-modification of the instructions relative to the number of instructions executed. This may also be desired for "data" banks, which will be described in more detail in connection with FIG. 11. When no transformation is desired, processing continues to the interpret subroutine 238 via link "E" 304 to link "E" 306 (see FIG. 4B).

Where decision step 300 recognizes a designated transformation level of GENERIC TRANSFORMATION as shown on line 308, a generic transformation is performed for various instructions. To transform an instruction via a generic transformation, the TYPE field 62 is set to type POINTER, as shown at step 310. The POINTER field 64 is set to include the address of a generic native mode emulation routine, from a library of generic instruction emulation routines, for the instruction. Generic instruction execution has "parameters" to interpret, such as the specific register and operand location. Processing proceeds to step 222 (FIG. 4A) where the routine at the pointer is executed. The procession to step 222 is shown via link "D" 312 to link "D" 314.

Where decision step 300 recognizes a designated transformation level of UNIQUE TRANSFORMATION as shown on line 316, a unique transformation is performed for various instructions. To transform an instruction via a unique transformation, the TYPE field 62 is set to type POINTER, as shown at step 318. The POINTER field 64 is set to include the address of a unique native mode emulation routine for the instruction. Unique instruction execution does not have "parameters" to interpret, and therefore unique instruction transformation yields faster executing code than its generic counterpart. The unique instruction transformation provides a routine to perform the entire instruction being emulated. As with generic transformation, processing proceeds to step 222 (FIG. 4A) where the routine at the pointer is executed. The advance to step 222 is shown via link "D" 320 to link "D" 314.

Where decision step 300 recognizes a designated transformation level of GENERIC FUNCTION as shown on line 322, the address in the POINTER field 64 points to a generic native mode routine that emulates a "function" produced by this instruction and some number of following instructions. Generic function execution, like generic instruction execution, may have "parameters" to interpret, such as the specific registers and operand locations for the series of instructions.

Generic function transformation begins at step 324, where a number of the next several instructions are gathered. The number of instructions gathered depends on the level of sophistication of the transformer or programmer-provided functions, which illustrates the flexibility of the present invention. Processing continues at decision step 326, where it is determined whether there is a match to an existing generic function. Decision step 326 recognizes whether the instructions obtained at step 324 match a particular sequence of instructions. If no match occurs, processing returns to step 310 via link "F" 328 to link "F" 330, which then treats the gathered instructions as individual instructions requiring individual generic transformations as if processing had taken path 308. If the instructions gathered at step 324 match a predefined sequence of instructions, processing continues at step 332 of FIG. 4D via link "G" 334 to link "G" 336.

Referring now to FIG. 4D, step 332 includes setting the type in the TYPE field 62 to POINTER, and entering the address of the generic native mode routine which performs the function in the POINTER field 64. The function is executed by continuing to step 338, where the pointer for the first instruction of the function is obtained, and processing continues to step 222 of FIG. 4A via link "D" 340 to link "D" 314. The function is then performed by executing the routine shown at step 222.

Returning again to FIG. 4C, where decision step 300 recognizes a designated transformation level of UNIQUE FUNCTION as shown on line 342, the address in the POINTER field 64 points to a unique native mode routine that emulates a unique function produced by this instruction and some number of following instructions. Unique function execution, like unique instruction execution, does not have "parameters" to interpret, and therefore unique function transformation yields faster executing code than its generic counterpart. For example, a transformed unique function routine performs better than the transformed generic function routine because parameters such as specified registers and storage locations are compiled into the routine. A unique function routine might completely replace a LOAD, ADD, and STORE routine designating specific address registers, index registers and data. A unique function transformation provides a routine to perform exactly the sequence of instructions being emulated.

Unique function transformation begins at step 344, where a number of the next several instructions to be emulated are obtained. Processing continues at decision step 346, where it is determined whether there is a match to an existing unique function. Decision step 346 recognizes whether the instructions obtained at step 344 match a particular sequence of instructions having particular parameters. If no match occurs, processing continues to step 348 of FIG. 4E via link "H" 350 to link "H" 352. If a match occurs, processing continues to step 354 of FIG. 4E via link "I" 356 to link "I" 358.

Referring now to FIG. 4E, where no match occurred at decision step 346, step 348 is executed which creates a unique native mode function for the sequence of instructions. This function will be the native mode equivalent of the function indicated by the corresponding target instructions, and the native mode instructions will be stored into at least one of the native mode instruction banks 21 shown in FIG. 1.

Where there was a match at decision step 346 and a function therefore does exist, step 354 is executed which gets the address of the function and each instruction in the function. Processing continues from steps 348 and 354 to link "J" 360 and onto step 362. Step 362 includes setting the type in the TYPE field 62 to POINTER, and setting the POINTER field 64 for each instruction to store the respective addresses for the unique routine. The function is set up for being executed by continuing to step 364, where the pointer for the first instruction of the function is obtained, and continuing to step 310 of FIG. 4C via link "F" 366 to link "F" 330 where processing continues normally.

Returning again to FIG. 4C, where decision step 300 recognizes a designated transformation level of FULL TRANSFORMATION as shown on line 368, the entire program is transformed as illustrated at step 370. The function of a full transformation is to analyze the "function" of the executing original target system instructions and produce a native mode routine which provides the same function. Such a transformation can be complex, thereby consuming a large amount of time on the first execution of a routine.

Programs that are likely candidates for full transformation have a large majority of execution time spent in a relatively small number of instructions. A method for determining which instructions are highly used, and therefore strong candidates for full transformation, can be implemented. For example, an instruction utilization profile may be provided to the transformation program. This profile can be produced by periodically sampling the instruction address as the program is being executed. The lower bits of this address are shifted off for scaling. This result is then used as an index to increment a value in a table of accumulated counts.

The resulting table of counts reflects the relative time spent in each block of instructions. Input parameters to the transformation process provides information as to what amount of instruction activity is worthy of full transformation. The instructions within the instruction banks that have activity above this level may then be selected to be fully transformed. A lower level of transformation may be used on other instruction banks.

When the program has been transformed at step 370, processing continues to step 372, where the pointer for the instruction that caused the full transformation is retrieved. Processing then continues at step 362 of FIG. 4E via link "J" 374 to link "J" 360 to cause the program that was just transformed to be executed.

FIG. 4F is a more detailed flow diagram of the instruction with indexed operand routine at step 246 shown in FIG. 4B. Processing begins at step 400, where a saved Active Base Table (ABT) is retrieved. If the saved ABT entry is equal to the current ABT entry for the retrieved address, it indicates that the same "bank" is being accessed. Where the saved and current ABT entries are equal, and the index is within the range of the particular bank being accessed, decision step 402 directs processing to step 404. Step 404 includes getting the indexed, transformed address of the operand, and then getting the address of the routine which will emulate the instruction. Processing then continues to step 222 via link "D" 406 to link "D" 314 in FIG. 4A.

Decision step 402 can optionally be directed to step 408, where each increment use is counted. The count can be incremented where a particular bank is consecutively accessed, or can be incremented if within certain defined parameters, such as within a particular time frame or if accessed a certain percentage of the time. In a preferred embodiment, each "consecutive" bank access causes the use count to increment, wherein the use count may cease to increase at a predefined maximum value. Incrementing the "use count" provides an indication of how often that particular bank is accessed, and whether it may be beneficial to transform the information. The increment count is saved to be compared to a predetermined value in decision step 412, which is discussed more fully below.

Where the saved and current ABTs are not equal, decision step 402 directs processing to step 410. Step 410 includes validating the indexed operand address against the ABT. Where the operand address is not within the ABT, the instruction is aborted and an error is reported indicating an invalid operand address. Where the operand address is valid, the "saved ABT" is updated with the "current ABT", and the "use count" is cleared. Processing then continues to step 404, and continues to step 222 via link "D" 406 to link "D" 314 in FIG. 4A.

Decision step 402 can optionally be directed to decision step 412 when the saved ABT is not equal to the current ABT. Decision step 412 checks the saved "use count" and determines whether the use count is too small by comparing the saved use count to a predefined desired value. Where the use count is not too small, processing continues to step 410 which was previously described. Where the use count is too small, it indicates that it is not worth the effort to have the instruction transformed, and processing continues to step 414 where the number of instructions that point to this entry is decremented, and the TYPE field is set to EXECUTED. Processing then continues to subroutine 238 via link "E" 416 to link "E" 304 and ultimately to link "E" 306 in FIG. 4B.

FIG. 4G is a more detailed flow diagram of the instruction with non-indexed operand routine at step 250 shown in FIG. 4B. Processing begins at step 430, where the saved Active Base Table (ABT) is retrieved. If the saved ABT entry is equal to the current ABT entry, it indicates that the same bank is being accessed. Where the saved and current AETs are equal, decision step 432 directs processing to step 434. Step 434 includes getting the transformed address of the operand, and then getting the address of the routine which will emulate the instruction. Processing then continues to step 222 via link "D" 436 to link "D" 314 in FIG. 4A. Decision step 432 can optionally be directed to step 438, where each increment use is counted, as was previously described in connection with FIG. 4F.

Where the saved and current ABT entries are not equal, decision step 432 directs processing to step 440, which includes validating the operand address against the ABT. Where the operand address is not within the ABT, the instruction is aborted and an error is reported indicating an invalid operand address. Where the operand address is valid, the "saved APT" is updated with the "current ART", and the "use count" is cleared. Processing then continues to step 434, and continues to step 222 via link "D" 436 to link "D" 314 in FIG. 4A.

Decision step 432 can optionally be directed to decision step 442 when the saved ABT is not equal to the current ABT. Decision step 442 checks the saved "use count" and determines whether the use count is too small, as was described in connection with FIG. 4F. Where the use count is not too small, processing continues to step 440 which was previously described. Where the use count is too small, processing continues to step 444 where the number of instructions that point to this entry is decremented. The TYPE field is set to EXECUTED, and processing continues to subroutine 238 via link "E" 446 to link "E" 304 and ultimately to link "E" 306 in FIG. 4B.

FIG. 4H is a flow diagram of the routine at step 238 shown in FIG. 4B. Processing begins at step 460, where the target instruction to be emulated is decoded. At step 462, the interpreter performs all direct and derivative functions to be interpreted in the proper order using native mode machine language. Processing returns as illustrated at return step 464.

The interpreter performs the same functions as does the target processor. The interpreter may not have as many parallel paths or overlapped pipeline stages that a hardware processor may have. Interpreters are known in the art, and various types of interpreters may be used without departing from the scope and spirit of the invention.

FIGS. 5 through 11 illustrate examples of transformations in accordance with the present invention. These examples correspond to various embodiments of the flow diagrams FIG. 3 through FIG. 4H as they apply to an emulation system 10 (shown in FIG. 1) having an instruction format such as the transformed instruction 50 (shown in FIG. 2).

Figure 5:
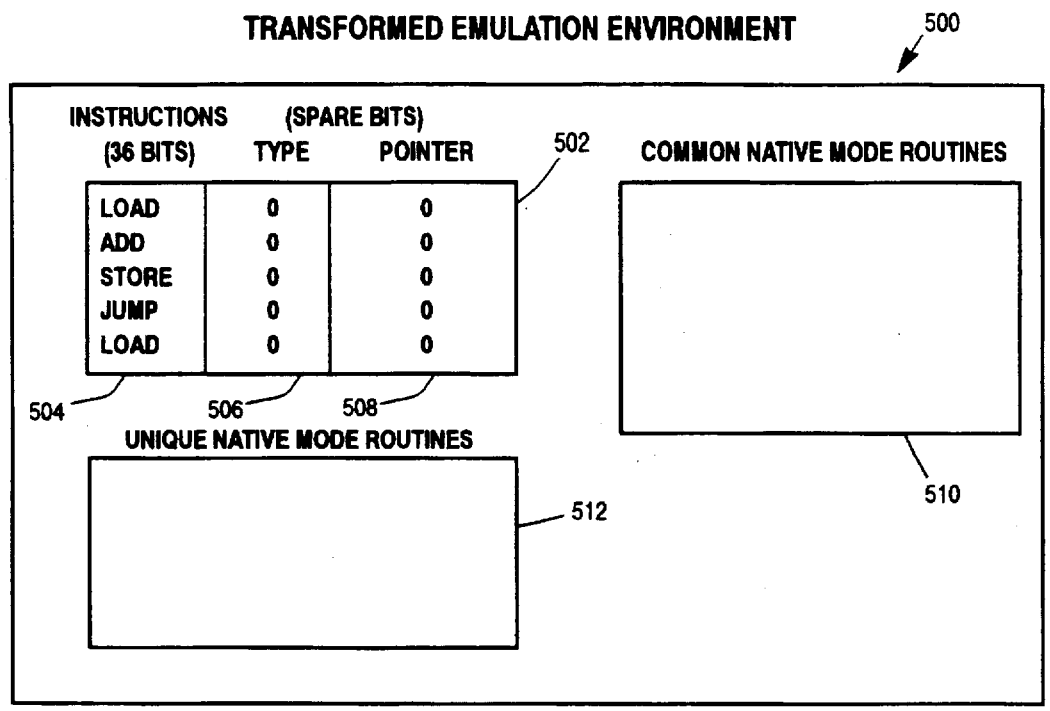
FIG. 5 illustrates a transformed emulation environment.

Referring now to FIG. 5, a transformed emulation environment 500 is shown. An instruction bank 502, such as the target bank 16 of FIG. 1, illustrates a plurality of sequential instructions in the instruction bank 502. These instructions are in a form similar to the transformed instruction 50 of FIG. 2, including an instruction field 504, a type field 506, and pointer field 508. These fields are analogous to the instruction field 18, the type field 62, and the pointer field 64 respectively, as shown in FIG. 2. In one embodiment, the instruction in field 504 is 36 bits wide in a 64-bit bus, wherein the remaining 28 bits comprise the spare, or additional, bits comprising fields 506 and 508. The type and pointer fields 506 and 508 for each of the instructions in instruction bank 502 are originally zero-filled as shown in FIG. 5, indicating that these instructions have not yet been transformed. As was described in connection with FIG. 3, decision step 102 determines whether the instruction has previously been transformed by determining whether the type is equal to type "ORIGINAL", wherein type "ORIGINAL" is represented by a type value 0 as shown in the type field 506 of FIG. 5.

As has been previously described, one object of transformed emulation is to transform the instructions into a more easily emulated form at the time of the first execution of the instruction. Therefore, when the type field 506 includes an indication that the instruction is type "ORIGINAL", the emulator performs a transformation where desired to generate transformed instructions, which allows subsequent execution of the transformed instructions to be accomplished much more quickly and effectively.

Also included within the transformed emulation environment 500 are native mode program routines which emulate various instructions or groups of instructions from the target system. Among these native mode routines are the common native mode routines 510, which is a programmed area containing program routines in the native mode machine language that are generic routines available for use by various instructions in multiple instruction banks. The unique native mode routines 512 is program space containing program routines prepared in the native mode machine language that are unique to a particular instruction bank, whether prepared by way of generation by the transformer or by way of a program being written. Generic transformations, which are stored in the common native mode routines 510, allows for a great deal of flexibility, as these generic routines are accessible by all instruction banks, and can be defined to include a desired number of input parameters.

Figure 6:
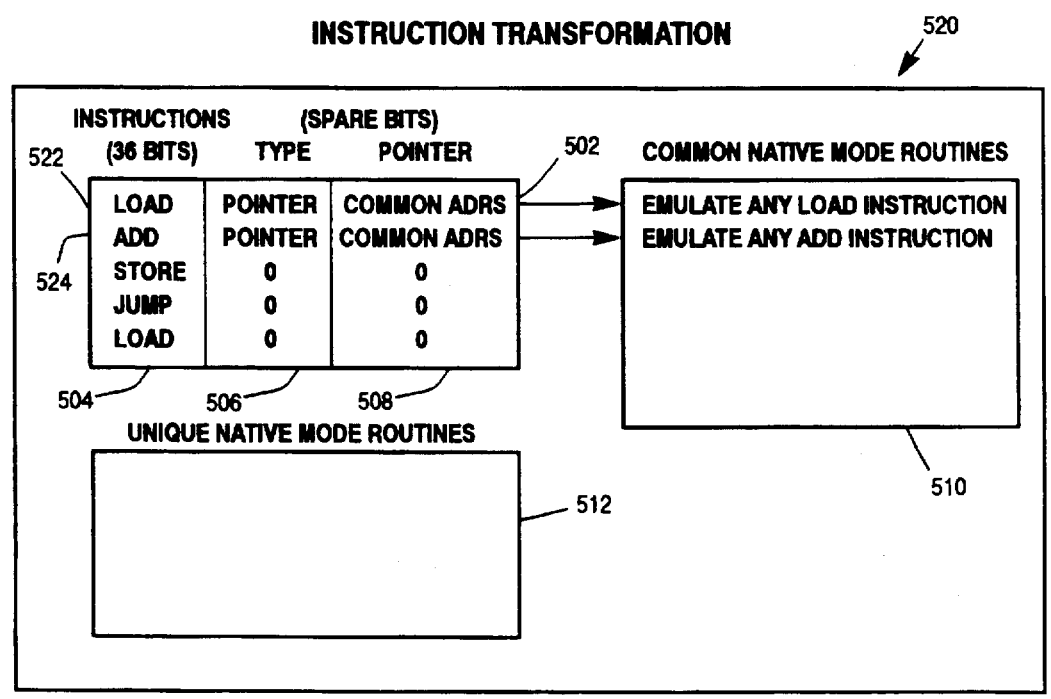
FIG. 6 illustrates a generic instruction transformation.

Referring now to FIG. 6, a generic instruction transformation 520 is illustrated. The LOAD instruction 522 and the ADD instruction 524 in instruction bank 502 are shown as transformed instructions. This is evident because of the non zero value in the type field 506. The instructions 522 and 524 have been transformed to type "POINTER", and the value in the pointer field 508 has been changed to a native mode generic or common address of a program routine in the native mode machine language of the emulation system. Therefore, when the LOAD and ADD instructions 522 and 524 are executed after its initial transformation, a common or generic native mode routine in the native mode routine program space 510 is executed. The native mode routine executed is common or generic because it executes a native mode equivalent of the instruction in the instruction bank 502, however specific information is still required for the LOAD and ADD native mode routines to know what to load and what to add. By utilizing the common native mode routines in the program space 510, the emulator no longer has to perform various tasks such as decoding the instruction from the instruction bank 502, because it knows to jump to the native mode address provided by the pointer field 508, and execute the existing native mode routine at that address.

Figure 7:
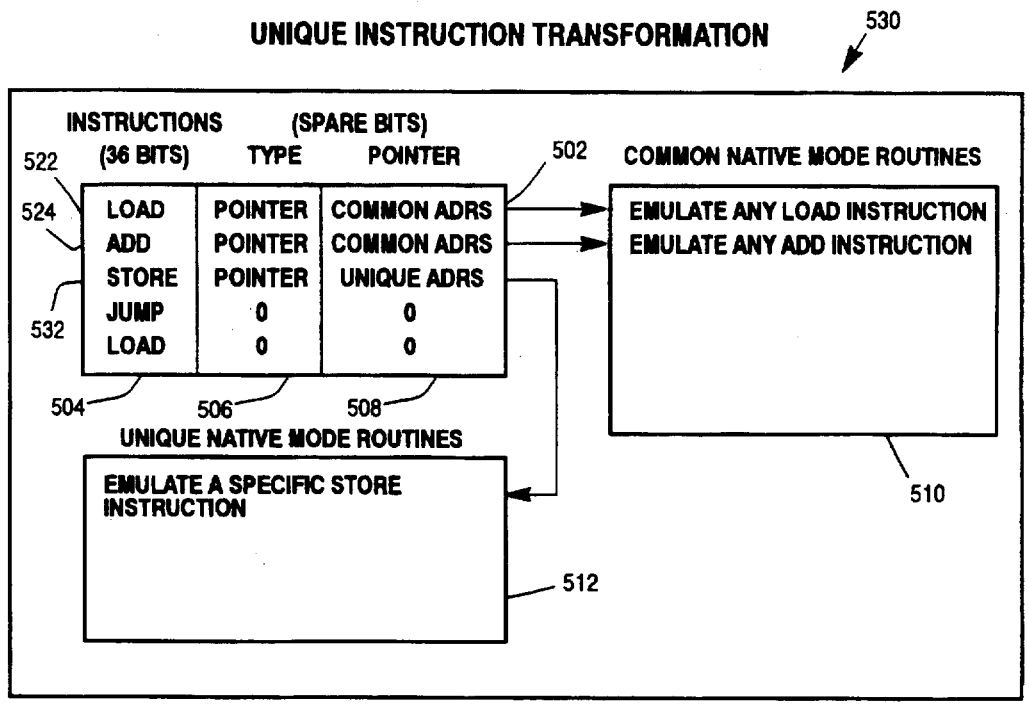
FIG. 7 illustrates a unique instruction transformation.

Referring now to FIG. 7, a unique instruction transformation 530 is illustrated. For a unique instruction transformation, native mode routines are specific to each instruction in the associated instruction bank. Therefore, instructions from the instruction bank 502 which have fixed operands or operand locations are replaced by native mode routines which perform the same function.

For example, the STORE instruction 532 has been transformed to type POINTER, having a pointer value having a unique address. When the transformed STORE instruction 532 is executed, the emulator jumps to the unique address in the pointer field 508, and executes the native mode routine in the unique native mode routine program space 512 which includes a routine to execute that specific STORE instruction 532 in the native mode machine language. Unique instruction transformation increases the efficiency of the system, particularly where an instruction is executed many times, or where many copies of a particular instruction appear in the program.

Figure 8:
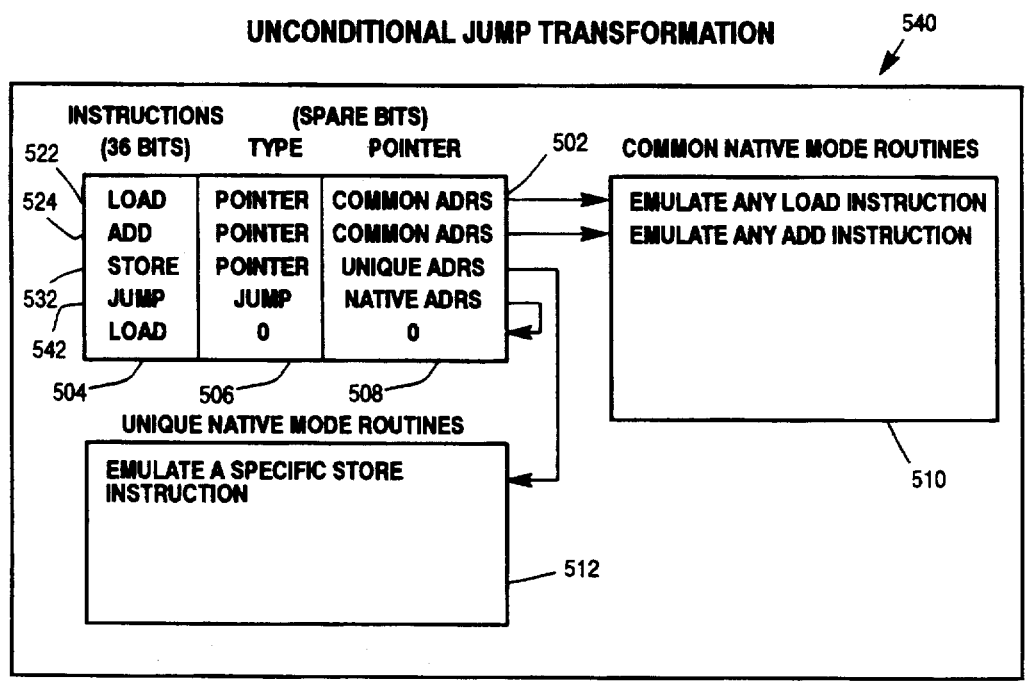
FIG. 8 illustrates an unconditional jump transformation.

Referring now to FIG. 8, an unconditional jump transformation 540 is illustrated. This type of transformation occurs when the type field 506 is transformed to be type JUMP. The transformed JUMP instruction 542 in the instruction bank 502 has a type JUMP in the type field 506, and a native mode machine language address in the pointer field 508. Therefore, when the transformed JUMP instruction 542 is executed, the emulator jumps to the native mode address presented by the pointer field 508 to immediately begin processing another instruction in the instruction bank 502. The address jumped to is a native mode address to move processing to a native mode address which has been transformed from the jump address of the original JUMP instruction 542.

Figure 9:
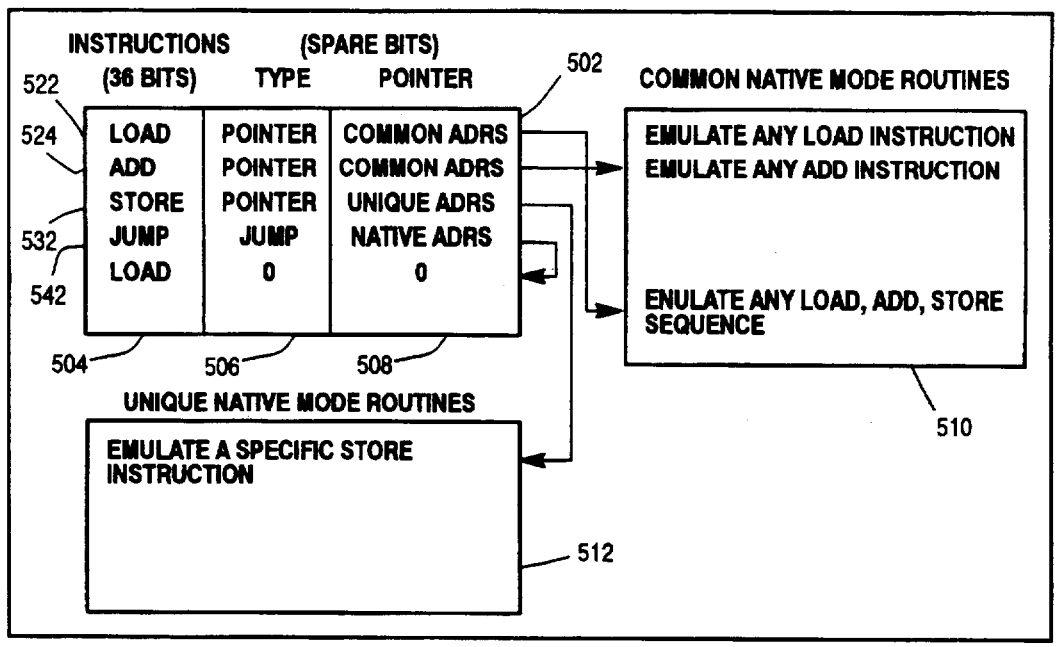
FIG. 9 illustrates a generic function transformation.

Referring now to FIG. 9, a generic function transformation 550 is illustrated. The generic function transformation is performed by creating a pointer to a common or generic routine in the common native mode routine program space 510 which performs the function of a series of instructions. For example, the LOAD, ADD, and STORE instructions 522, 524, and 532 can be replaced with an "ADD TO MEMORY" native mode routine. This routine is stored in the program space 510, and various parameters are still entered into this generic function, allowing it to be used by various LOAD, ADD, and STORE instruction sequences from one or more instruction banks.

Figure 10:
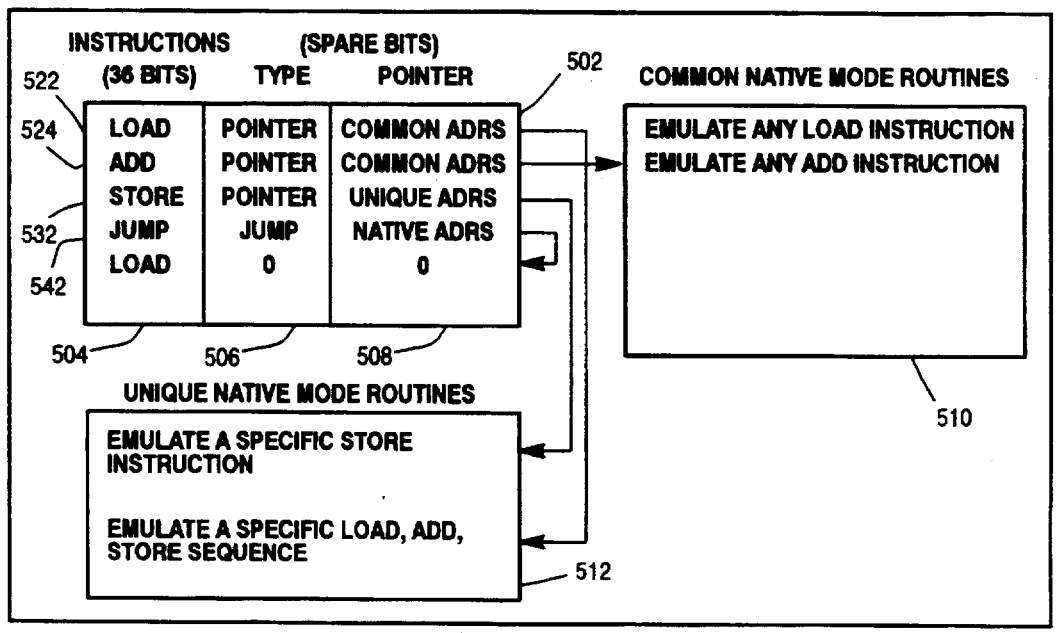
FIG. 10 illustrates a unique function transformation.

Referring now to FIG. 10, a unique function transformation 560 is illustrated. A unique function transformation provides a native mode routine which performs the exact function of the replaced function. For example, this native mode routine could add a specific storage location to another specific storage location. This is accomplished by providing a specific LOAD, ADD, and STORE sequence provided as a native mode routine in program space 512. Therefore, if a particular LOAD, ADD, and STORE sequence is routinely executed, it may be wise to provide a native mode routine which performs all of these instructions having their specific parameters already accounted for by the unique native mode routine in program space 512.

In both generic and unique function transformation, instructions other than the first instruction may be left "original", or may be set to a particular type such as "executed". The type of the instructions other than the first instruction may also be set to a "pointer" to other generic or unique instruction routines. This allows jumps to these instructions so that they may be individually emulated. However, where a jump is to the first instruction in a predefined group of instructions, the function of the multiple instructions will be emulated via the generic or unique transformation method.

Figure 11:
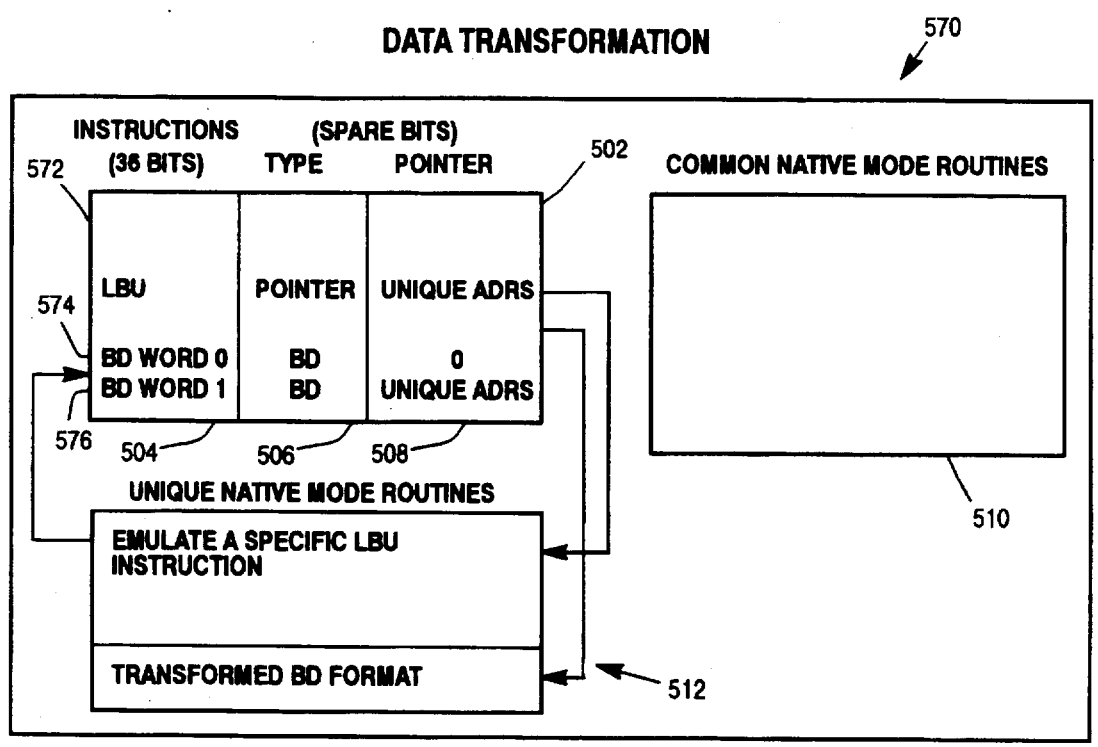
FIG. 11 illustrates a data transformation.

Referring now to FIG. 11, a data transformation 570 is illustrated. A "data" transformation is one where information which is not a part of the instruction is transformed, although part of this information may be an extension of the instruction. For example, in a target system having a fixed-length instruction, it is possible that some functions require one operand to be a packet containing addresses of multiple operands. For instance, a bit move command moves information from address A to address B. Because the system is a single instruction machine, it can not point to both address A and address B within one instruction. So the instruction data packet has source and destination addresses, which are "extensions" of the instruction in subsequent bytes or words. The source and destination components can use indexed addressing, non-indexed addressing, etc. as the instructions had.

This results in a first-level transformation which transforms the instruction, and also allows a second-level transformation directed to the "extended", or "data" packet portions. By transforming this extended packet portion, execution is faster. However, if the packet is modified often, it may not be worth performing the transformation on the "data" packet portion, in which case it will be treated as a TYPE of EXECUTED, which is not transformed.

FIG. 11 illustrates one embodiment where a data transformation occurs. Instructions may use data which includes descriptors, which includes information which is an extension of the instruction. A TYPE BD in the TYPE field 506 allows for a transformed bank descriptor (BD) format that can be referenced directly. In this case, the descriptor data can be transformed into a form that is more easily processed by the emulator. This process is analogous to instruction transformation, described above. Data transformation is typically performed in the case where the data is frequently read, but seldom, if ever changed.

Other particular instructions may also use data, such as the example LBU instruction 572. These instructions load base registers from structures in storage called bank descriptors (BD). The BD information in storage is data that is frequently read and very rarely changed. So any data that is frequently read and rarely changed would be a good candidate for data transformation, as subsequent transformations will be proportionately rare.

The LBU instruction 572 is uniquely transformed as shown in unique native mode routine program space 512, and the corresponding "extended instruction" data is loaded into the instruction field 504 as can be seen by BD word 0 574 and BD word 1 576 which is initially type "original". Subsequent access of these words will include the type is ED in the type field 506 of one of the data words (ED word 1 576 in this example) and will have information in the pointer field 508, as is shown in FIG. 11. If any of the data words get changed, the type will return to type "original". This is analogous to instruction transformation as previously described.

The information in the pointer field 506 points to the more usable form of the bank descriptor, which is identified by the unique address in the pointer field 508. This more usable data is at the address pointed to by the POINTER field 508, and is shown as the "Transformed BD format" in the unique native mode routine program space 512.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A method for emulating a computer system on an emulation host computing system, the computer system being controlled by a plurality of target instructions stored in one or more instruction banks, the method comprising the steps of:

(a) successively receiving the target instructions from the instruction bank in their order of execution;

(b) interpreting each of the target instructions to identify a function designated by the target instructions;

(c) executing the functions identified by the interpreting step using hardware and native mode machine language of the emulation host computing system;

(d) transforming selected ones of the target instruction into transformed instructions, the transformed instructions including the target instruction and an emulation code which controls the manner in which subsequent executions of the transformed instructions occur;

(e) analyzing the emulation code for the target instructions that have previously been transformed into transformed instructions, and executing the transformed instructions' corresponding functions in response to the emulation code using the hardware and the native mode machine language of the emulation host computing system, wherein the steps of interpreting and transforming are bypassed for subsequent occurrences of the transformed instructions; and selecting a transformation level from a plurality of different transformation levels, wherein each of the transformation levels defines a different degree of transformation for selected ones of the one or more instruction banks.

2. The method of claim 1, wherein the step of selecting a transformation level comprises the step of selecting a null transformation level so that no target instructions within the selected ones of the one or more instruction banks are transformed.

3. The method of claim 1, wherein the step of selecting a transformation level comprises the step of selecting a generic transformation level, wherein the target instructions within the selected ones of the one or more instruction banks are transformed to designate shared, native mode emulation routines for performing the function designated by one of the target instructions, and wherein specific parameters associated with the target instructions are inputted into the shared, native mode emulation routines.

4. The method of claim 1, wherein the step of selecting a transformation level comprises the step of selecting a generic function transformation level, wherein the target instructions within the selected ones of the one or more instruction banks are transformed to designate shared, native mode emulation function routines for performing the functions designated by a plurality of consecutive target instructions, and wherein specific parameters associated with the target instructions are inputted into the shared, native mode emulation function routines.

5. The method of claim 1, wherein the step of selecting a transformation level comprises the step of selecting a unique transformation level, wherein the target instructions within the selected ones of the one or more instruction banks are transformed to designate unique, native mode emulation routines for performing the function designated by one of the target instructions, and wherein no additional specific parameters associated with the target instructions are required by the unique, native mode emulation routines.

6. The method of claim 1, wherein the step of selecting a transformation level comprises the step of selecting a unique function transformation level, wherein the target instructions within the selected ones of the one or more instruction banks are transformed to designate unique, native mode emulation function routines for performing the functions designated by a plurality of the target instructions, and wherein no additional specific parameters associated with the target instructions are required by the unique, native mode emulation function routines.

7. The method of claim 1, wherein the step of selecting a transformation level comprises the step of selecting a full transformation level, so that all target instructions within the selected ones of the one or more instruction banks are transformed.

8. An emulator for emulating a target computer system controlled by a plurality of target instructions, the emulator comprising:

(a) storage means for storing the target instructions and emulation software routines in a plurality of storage banks, and for storing a predetermined transformation level designator identifying the degree to which each predetermined group of target instructions will be transformed;

(b) input means, coupled to the storage means, for receiving the plurality of target instructions in the order of their execution;

(c) control means, coupled to the input means, for determining whether each of the target instructions has previously been transformed;

(d) transformation means, coupled to the control means, for converting selected ones of the target instructions into transformed instructions, wherein each of the transformed instructions is associated with a transformation type identifier which directs a manner of execution of its associated transformed instruction;

(e) interpretation means, coupled to the transformation means, for decoding non-transformed target instructions to identify one or more functions designated therein; and (f) processing means for executing the one or more functions designated by the non-transformed target instructions, and for executing the emulation software routines associated with the transformed instructions according to the transformation type identifier, and according to the degree of transformation identified by the corresponding transformation level.

9. The emulator as in claim 8, wherein the control means comprises comparing means for comparing the transformation type identifier to a predefined original value, and for indicating that the target instructions have previously been transformed when the transformation type identifier has been altered from the predefined original value.

10. The emulator as in claim 8, further comprising an instruction use counter, coupled to the input means, to store a use count corresponding to the frequency in which a particular target instruction is loaded.

11. The emulator as in claim 10, further comprising a selector for utilizing the use counter, thereby optionally storing the use count when desired.

12. The emulator as in claim 10, wherein the instruction use counter comprises compare means for determining the frequency in which a particular target instruction is loaded by comparing the use count to a stored count relating to a predetermined criteria.

13. The emulator as in claim 12, wherein the predetermined criteria is selected from the group comprising a predetermined number of consecutive instruction loads of a particular one of the target instructions, a number of instruction loads of the particular one of the target instructions within a predetermined period of time, and a number of executions without code modification.

14. The emulator as in claim 12, further comprising transformation level selection means for allowing a different transformation level to be selected depending on a result of the compare means.

15. A method for emulating a computer system on an emulation host computing system, the computer system being controlled by a plurality of target instructions which include extended packet data separate from its corresponding target instruction, the method comprising the steps of:

(a) loading each of the target instructions and extended packet data into the emulation host computing system in the order of the target instruction execution;

(b) transforming selected ones of the target instructions into transformed instructions recognizable by the native mode machine language of the emulation host computing system the first time each of the target instructions is loaded;

(c) transforming the extended packet data associated with each of the target instructions into transformed packet data recognizable by the native mode machine language of the emulation host computing system;

(d) interpreting the target instructions which were not transformed into transformed instructions; and (e) executing the transformed instructions and corresponding transformed packet data using software routines written in a machine language of the emulation host computing system.

16. A method for emulating a computer system on an emulation host computing system, the computer system being controlled by a plurality of target instructions, the method comprising the steps of:

(a) loading each of the target instructions into the emulation host computing system in the order of their execution;

(b) transforming selected ones of the target instructions into transformed instructions the first time each of the target instructions is accessed;

(c) associating an emulation field with each of the transformed instructions, wherein the emulation field comprises at least a type field and a pointer field;

(d) assigning one of a plurality of transformation type identifiers to the type field of each of the transformed instructions, wherein each of the transformation type identifiers direct a manner of execution of its associated transformed instruction; and (e) executing the transformed instructions according to their corresponding transformation type identifiers, using a native machine language of the emulation host computing system.

17. The method as in claim 16, wherein the transformation type identifier identifies the transformed instruction as a native mode jump instruction, wherein decoding the transformed instruction is bypassed, and instruction processing jumps to a particular target instruction identified by a native mode address pointer in the pointer field.

18. The method as in claim 16, wherein the transformation type identifier identifies the transformed instruction as a native mode pointer instruction, wherein decoding the transformed instruction is bypassed, and instruction processing is launched at a native mode routine identified by a native mode address pointer in the pointer field.

19. The method as in claim 16, wherein the transformation type identifier identifies the transformed instruction as an execute target instruction to identify the corresponding target instruction as one where no code transformation is to occur.

20. The method as in claim 16, wherein the transformation type identifier identifies the transformed instruction as an indexed instruction, wherein decoding the transformed instruction is bypassed, and instruction processing is launched at a native mode routine identified by a native mode address in an address operand of the transformed instruction which is offset by an address index value in the pointer field.

21. The method as in claim 16, wherein the transformation type identifier identifies the transformed instruction as a non-indexed instruction, wherein decoding the transformed instruction is bypassed, and instruction processing is launched at a native mode routine identified by a native mode address in an address operand of the transformed instruction.

22. The method of claim 16, further comprising the steps of:

(a) storing target instruction use information regarding the frequency in which a particular target instruction is loaded into the emulation host computing system;

(b) dynamically modifying the transformation type identifiers in response to the target instruction use information.

23. The method of claim 22, further comprising the steps of providing a plurality of selectable transformation levels each defining a different degree of desired transformation, and allowing selection of one of plurality of selectable transformation levels.

24. The method of claim 23, wherein the step of dynamically modifying the transformation type comprises the step of comparing the target instruction use information to a predefined use count, and selecting a particular one of the plurality of selectable transformation levels in response thereto.

25. A method for emulating a computer system on an emulation host computing system, the computer system being controlled by a plurality of target instructions, the method comprising the steps of:

(a) transforming selected ones of the target instructions into transformed instructions the first time each of the target instructions is accessed, wherein transforming target instructions comprises associating a transformation level with a predetermined group of the target instructions, and wherein each transformation level establishes a distinct degree of transformation to be performed on its corresponding one of the predetermined groups;

(b) associating an emulation field with each of the transformed instructions, wherein the emulation field comprises at least a type field and a pointer field;

(c) assigning one of a plurality of transformation type identifiers to the type field of each of the transformed instructions, wherein each of the transformation type identifiers direct a manner of execution of its associated transformed instruction; and (d) executing the transformed instructions according to their corresponding transformation level, and according to their corresponding transformation type identifiers, using a native machine language of the emulation host computing system.

26. The method as in claim 25, wherein associating a transformation level with a predetermined group of the target instructions comprises assigning at least one of the predetermined groups of the target instructions as a generic transformation level, wherein the target instructions within the predetermined group are transformed to designate shared, native mode emulation routines for performing the function designated by one of the target instructions, and wherein specific parameters associated with the target instructions are inputted into the shared, native mode emulation routines.

27. The method as in claim 25, wherein associating a transformation level with a predetermined group of the target instructions comprises assigning at least one of the predetermined groups of the target instructions as a generic function transformation level, wherein the target instructions within the selected ones of the one or more instruction banks are transformed to designate shared, native mode emulation functions for performing the functions designated by a plurality of consecutive target instructions, and wherein specific parameters associated with the target instructions are inputted into the shared, native mode emulation functions.

28. The method as in claim 25, wherein associating a transformation level with a predetermined group of the target instructions comprises assigning at least one of the predetermined groups of the target instructions as a unique transformation level, wherein the target instructions within the selected ones of the one or more instruction banks are transformed to designate unique, native mode emulation routines for performing the function designated by one of the target instructions, and wherein no additional specific parameters associated with the target instructions are required by the unique, native mode emulation routines.

29. The method as in claim 25, wherein associating a transformation level with a predetermined group of the target instructions comprises assigning at least one of the predetermined groups of the target instructions as a unique function transformation level, wherein the target instructions within the selected ones of the one or more instruction banks are transformed to designate unique, native mode emulation functions for performing the functions designated by a plurality of the target instructions, and wherein no additional specific parameters associated with the target instructions are required by the unique, native mode emulation functions.

* * * * *